(12) United States Patent
Okamoto et al.

(10) Patent No.: US 11,488,200 B2
(45) Date of Patent: Nov. 1, 2022

(54) ADVERTISING EFFECTIVENESS MEASURING SYSTEM, METHOD AND NON-TRANSITORY COMPUTER-READABLE STORAGE MEDIUM

(71) Applicant: GOOF, INC., Tokyo (JP)

(72) Inventors: Yukinori Okamoto, Tokyo (JP); Hirokazu Kondo, Tokyo (JP)

(73) Assignee: GOOF, INC., Tokyo (JP)

( * ) Notice: Subject to any disclaimer, the term of this patent is extended or adjusted under 35 U.S.C. 154(b) by 0 days.

(21) Appl. No.: 17/295,421

(22) PCT Filed: May 26, 2020

(86) PCT No.: PCT/JP2020/020748
§ 371 (c)(1),
(2) Date: May 19, 2021

(87) PCT Pub. No.: WO2020/241639
PCT Pub. Date: Dec. 3, 2020

(65) Prior Publication Data
US 2021/0357974 A1    Nov. 18, 2021

(30) Foreign Application Priority Data

May 30, 2019   (JP) ............................. JP2019-101650
Sep. 25, 2019   (JP) ............................. JP2019-174212

(51) Int. Cl.
*G06Q 30/00*   (2012.01)
*G06Q 30/02*   (2012.01)
(Continued)

(52) U.S. Cl.
CPC ..... *G06Q 30/0246* (2013.01); *G06F 16/9535* (2019.01); *G06Q 30/0271* (2013.01); *G09F 3/0297* (2013.01); *G09F 7/00* (2013.01)

(58) Field of Classification Search
CPC .......... G06Q 30/0246; G06Q 30/0271; G06Q 30/02; G06F 16/9535; G09F 3/0297; G09F 7/00
See application file for complete search history.

(56) References Cited

U.S. PATENT DOCUMENTS

| | | | |
|---|---|---|---|
| 2012/0245994 A1* | 9/2012 | Lovelace ............... | G06Q 30/02 705/14.41 |
| 2013/0226714 A1* | 8/2013 | Osewalt ................. | G06Q 30/02 705/14.73 |
| 2015/0262221 A1* | 9/2015 | Nakano .............. | G06Q 30/0275 705/14.45 |

FOREIGN PATENT DOCUMENTS

| | | |
|---|---|---|
| JP | 2002163565 | 6/2002 |
| JP | 2011008364 | 1/2011 |

(Continued)

OTHER PUBLICATIONS

J. V. Harrison and A. Andrusiewicz, "Using wireless networks to enhance narrowcasting in public spaces," First IEEE Consumer Communications and Networking Conference, 2004. CCNC 2004., 2004, pp. 600-604, doi: 10.1109/CCNC.2004.1286929. (Year: 2004).*

(Continued)

*Primary Examiner* — Sun M Li
(74) *Attorney, Agent, or Firm* — JCIPRNET

(57) ABSTRACT

A method for measuring effectiveness of a media-sharing advertisement includes: obtaining delivery destination ID identified in response to an access to a first address, which is based on a first code that is recorded on a print media and includes the first address to access to a first landing page corresponding to a first business entity of the print media and includes the delivery destination ID of the delivery destination of the print media; obtaining delivery destination ID identified in response to an access to a second address, which is based on a second code that is recorded on the print (Continued)

media and includes the second address to access to a second landing page corresponding to a second business entity that satisfies a media-sharing condition and includes the delivery destination ID, and ID of the second business entity; and providing the first and second business entities with the obtained information.

10 Claims, 34 Drawing Sheets

(51) Int. Cl.
  *G06F 16/9535* (2019.01)
  *G09F 3/00* (2006.01)
  *G09F 7/00* (2006.01)

(56) References Cited

FOREIGN PATENT DOCUMENTS

| | | |
|---|---|---|
| JP | 2011242999 | 12/2011 |
| JP | 2012064167 | 3/2012 |
| JP | 2017067996 | 4/2017 |
| JP | 2017102779 | 6/2017 |
| WO | 2016208080 | 12/2016 |

OTHER PUBLICATIONS

L. Invernizzi, K. Thomas, A. Kapravelos, O. Comanescu, J. Picod and E. Bursztein, "Cloak of Visibility: Detecting When Machines Browse a Different Web," 2016 IEEE Symposium on Security and Privacy (SP), 2016, pp. 743-758, doi: 10.1109/SP.2016.50. (Year: 2016).*

R. M. Bani-Hani, Y. A. Wahsheh and M. B. Al-Sarhan, "Secure QR code system," 2014 10th International Conference on Innovations in Information Technology (IIT), 2014, pp. 1-6, doi: 10.1109/INNOVATIONS.2014.6985772. (Year: 2014).*

"Google Analytics Guide", retrieved from <URL:https://www.google.com/grants/education/Google_Analytics_Training.pdf>, searched on May 1, 2020.

"All about the stats: Using Google Analytics to track QR Code visitors", retrieved from <URL:https://www butterfly.com.au/blog/digital-marketing/all-about-the-stats-using-google-analytics-to-track-qr-code-visitors>, searched on May 1, 2020.

"International Search Report (Form PCT/ISA/210) of PCT/JP2020/020748", with English translation thereof, dated Aug. 25, 2020, pp. 1-4.

"Written Opinion of the International Searching Authority (Form PCT/ISA/237) of PCT/JP2020/020748", dated Aug. 25, 2020, with English translation thereof, pp. 1-6.

* cited by examiner

```
<script type="text/javascript" src="qqq.js"></script>
<script type="text/javascript">
_media=XXX;
_measure();
</script>
```

FIG.15A

```
<script type="text/javascript" src="qqq.js"></script>
<script type="text/javascript">
_ad=YYY;
_measure();
</script>
```

FIG.15B

| # | ITEM | OUTLINE |
|---|---|---|
| 1 | MEDIA/ AD INFORMATION | UNIQUE VALUE FOR EACH MEASUREMENT TAG |
| 2 | MEDIA ID | UNIQUE VALUE FOR EACH MEDIA PRESENTED IN URL |
| 3 | TARGET ID | UNIQUE VALUE FOR EACH DELIVERY DESTINATION |
| 4 | COOKIE INFORMATION | |
| 5 | TBD | INFORMATION OF MOBILE TERMINAL, LOCATION INFORMATION, ETC. |

EXAMPLE OF INFORMATION OBTAINED FROM MEASUREMENT TAG OF MEDIA OWNER SIDE

1 : media=XXX

2 : media=XXX

3 : 1234

EXAMPLE OF INFORMATION OBTAINED FROM MEASUREMENT TAG OF ADVERTISER SIDE

1 : ad=YYY

2 : media=XXX

| ID INFORMATION OF DELIVERY DESTINATION | ACCESS TO LANDING PAGE OF MEDIA OWNER X | ACCESS TO LANDING PAGE OF MEDIA-SHARING ADVERTISER A |
|---|---|---|
| 1234 | 2019/4/15/13:12:26 | - |
| 5678 | - | 2019/4/15/17:56:11 |
| 9100 | 2019/4/16/7:24:45 | 2019/4/16/7:12:24 |
| 1123 | - | - |
| 3965 | - | - |
| ... | ... | ... |

FIG.23

REPORT

1. ACCESS RATE TO MEDIA OWNER X a %

2. ACCESS RATE TO ADVERTISER A b %

3. ACCESS RATE TO BOTH c %

- NO. OF PERSONS WHO FIRST ACCESSED MEDIA OWNER X AMONG PERSONS WHO ACCESSED BOTH d PERSONS (m %)

- NO. OF PERSONS WHO FIRST ACCESSED ADVERTISER A AMONG PERSONS WHO ACCESSED BOTH e PERSONS (n %)

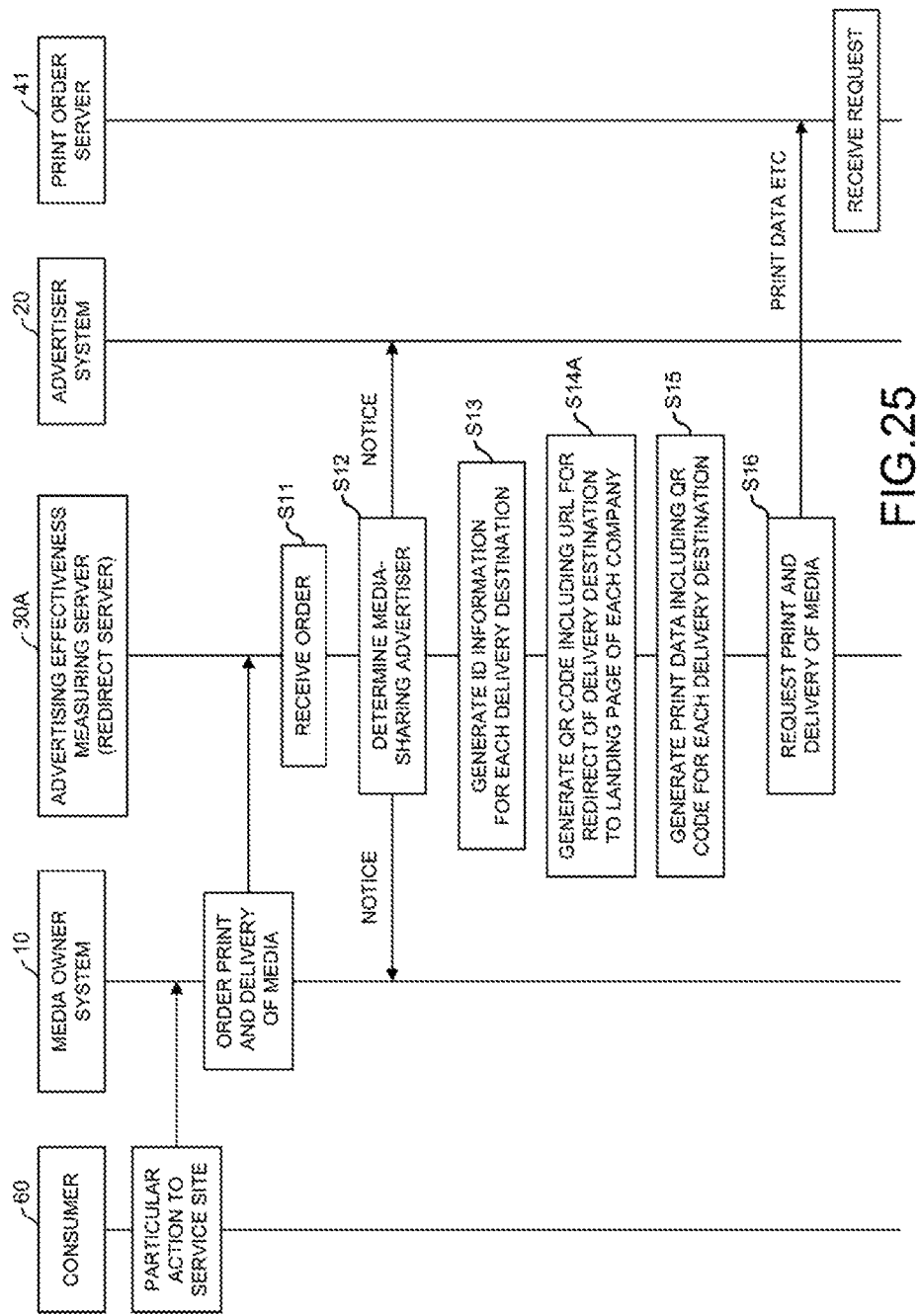

| DELIVERED ITEMS | MEDIA OWNER | ADVERTISER | DELIVERY DESTINATION |
|---|---|---|---|
| DIRECT MAIL POST CARD | SHIPPER ETC. OF DIRECT MAIL POST CARD | ARBITRARY | CONSUMERS ETC. |
| CATALOG/MAGAZINE | PUBLISHER, SHIPPER ETC. OF CATALOG ETC. | ARBITRARY | SUBSCRIBERS ETC. |
| PHOTO BOOK | TRUSTEE ETC. OF PHOTO BOOK | ARBITRARY | ORDERERS ETC. |
| INFORMATIONAL MAGAZINE ACCORDING TO ATTRIBUTE OF TRAVELER | TRAVEL OPERATOR, LODGING OPERATOR ETC. | ARBITRARY | LODGING PLACES ETC. |
| FLYER PACKED WITH PURCHASED ITEM OF ONLINE SHOPPING | COMPANY ETC. OF ONLINE SHOPPING | ARBITRARY | PURCHASERS ETC. |
| ... | ... | ... | ... |

FIG.30

ORDER #1 OF PRINT AND DELIVERY ~3141

| DELIVERY DESTINATION | ID INFORMATION |
|---|---|
| DELIVERY DESTINATION 1 | 1234 |
| DELIVERY DESTINATION 2 | 5678 |
| DELIVERY DESTINATION 3 | 9100 |
| ... | ... |

ORDER #2 OF PRINT AND DELIVERY ~3141

| DELIVERY DESTINATION | ID INFORMATION |
|---|---|
| DELIVERY DESTINATION 1 | 2345 |
| DELIVERY DESTINATION 2 | 6789 |
| DELIVERY DESTINATION 3 | 1012 |
| ... | ... |

FIG.32B

ADVERTISING EFFECTIVENESS MEASURING SYSTEM, METHOD AND NON-TRANSITORY COMPUTER-READABLE STORAGE MEDIUM

CROSS-REFERENCE TO RELATED APPLICATION

This application is a 371 application of the International PCT application serial no. PCT/JP2020/020748, filed on May 26, 2020, which claims the priority benefit of Japan Patent Application No. 2019-101650, filed on May 30, 2019 and Japan Patent Application No. 2019-174212, filed on Sep. 25, 2019. The entirety of each of the above-mentioned patent applications is hereby incorporated by reference herein and made a part of this specification.

TECHNICAL FIELD

This invention relates to an advertising effectiveness measuring system and program.

BACKGROUND TECHNOLOGY

Access analysis is one of the methods for measuring advertising effectiveness. By the access analysis, it is possible to know the number of user accesses to the Web page to be measured and the like. The Web page to be measured includes, for example, a page called a landing page. A landing page is a page that a consumer first visits, for example, by scanning a QR (Quick Response) code (registered trademark) printed on direct mail. A system for measuring the number of accesses to the landing page through scanning the QR code has been put into practical use.

Direct mail postcard is not limited to being delivered from a single business entity alone, but may be delivered from multiple business entities in a media-sharing form. Regardless of the delivery of the direct mail postcard, the measurement results such as the number of accesses to the landing page or the like can only be known by the business entity who operates the landing page. For example, even if the advertisement of business entity A and the advertisement of business entity B are printed on the direct mail post, and the consumer who is the destination of the direct mail post scans the QR code included in the advertisements and accesses the landing page, the business entity A cannot know the result of measuring the accesses to the landing page of the business entity B, and the business entity B cannot know the result of measuring the accesses to the landing page of the business entity A. In other words, the current system cannot analyze the effect of advertisements, which is caused by the media-sharing, when direct mail postcards are sent in the media-sharing form.

PRIOR TECHNICAL DOCUMENTS

Non-Patent Documents

Non-Patent Document 1: "Google Analystic Guide", [online] [Searched on May 1, 2020], Internet <URL:https://www.google.com/grants/education/Google_Analytics_Training.pdf>

Non-Patent Document 2: "All about the stats: Using Google Analytics to track QR Code visitors", [online] [Searched on May 1, 2020], Internet <URL:https://www.butterfly.com.au/blog/digital-marketing/all-about-the-stats-using-google-analytics-to-track-qr-code-visitors>

SUMMARY OF THE INVENTION

As one aspect, an object of this invention is to provide a mechanism that enables analysis of the effectiveness of a media-sharing type advertisement when plural business entities place advertisements in the media-sharing form.

An advertising effectiveness measuring method according to this invention includes: (A) generating first data that is to be recorded on a print media of a first business entity and is personalized for each delivery destination of the print media and includes a first code, wherein the first code includes a first address to access a first landing page corresponding to the first business entity by a user of the delivery destination of the print media and delivery destination identification information to identify the delivery destination of the print media; (B) generating second data that is to be recorded on the print media and is personalized for each delivery destination of the print media and includes a second code, wherein the second code includes a second address to access a second landing page corresponding to a second business entity that satisfies a predetermined media-sharing condition by a user of the delivery destination; (C) obtaining the delivery destination identification information specified according to an access to the first address, which is based on the first code; (D) obtaining the delivery destination identification information specified according to an access to the second address, which is based on the second code, and identification information to identify the second business entity; and (E) providing the second business entity with a first result measured for accesses to the first landing page from users of delivery destinations and providing the first business entity with a second result measured for accesses to the second landing page from users of delivery destinations in association with the identification information to identify the second business entity.

BRIEF DESCRIPTION OF THE DRAWINGS

FIG. 15A is a diagram depicting an example of a landing page of a media owner;

FIG. 15B is a diagram depicting an example of a landing page of an advertiser;

FIG. 22 is a diagram depicting an example of information which the advertising effectiveness measuring server obtains through a measurement tag;

FIG. 23 is a diagram to explain an example of a table to manage results of the accesses to the media owner and the advertiser, which are analyzed by using identification information unique to the delivery destination;

FIG. 24 is a diagram depicting an example of a report which analyzed the effectiveness of the media-sharing type advertisement;

FIG. 25 is a diagram to explain a portion of a processing operation of the advertising effectiveness measuring server used in embodiment 2;

FIG. 30 is a diagram to explain various use examples of a paper advertisement system;

FIG. 32B is a diagram depicting an example of the delivery destination DB, which manages different identification information for each order even in case of the same delivery destination.

MODE FOR CARRYING OUT THE INVENTION

Hereinafter, embodiments of this invention will be described with reference to the drawings.

Embodiment 1

<Overall Configuration of Paper Advertisement System>

Figure 1:
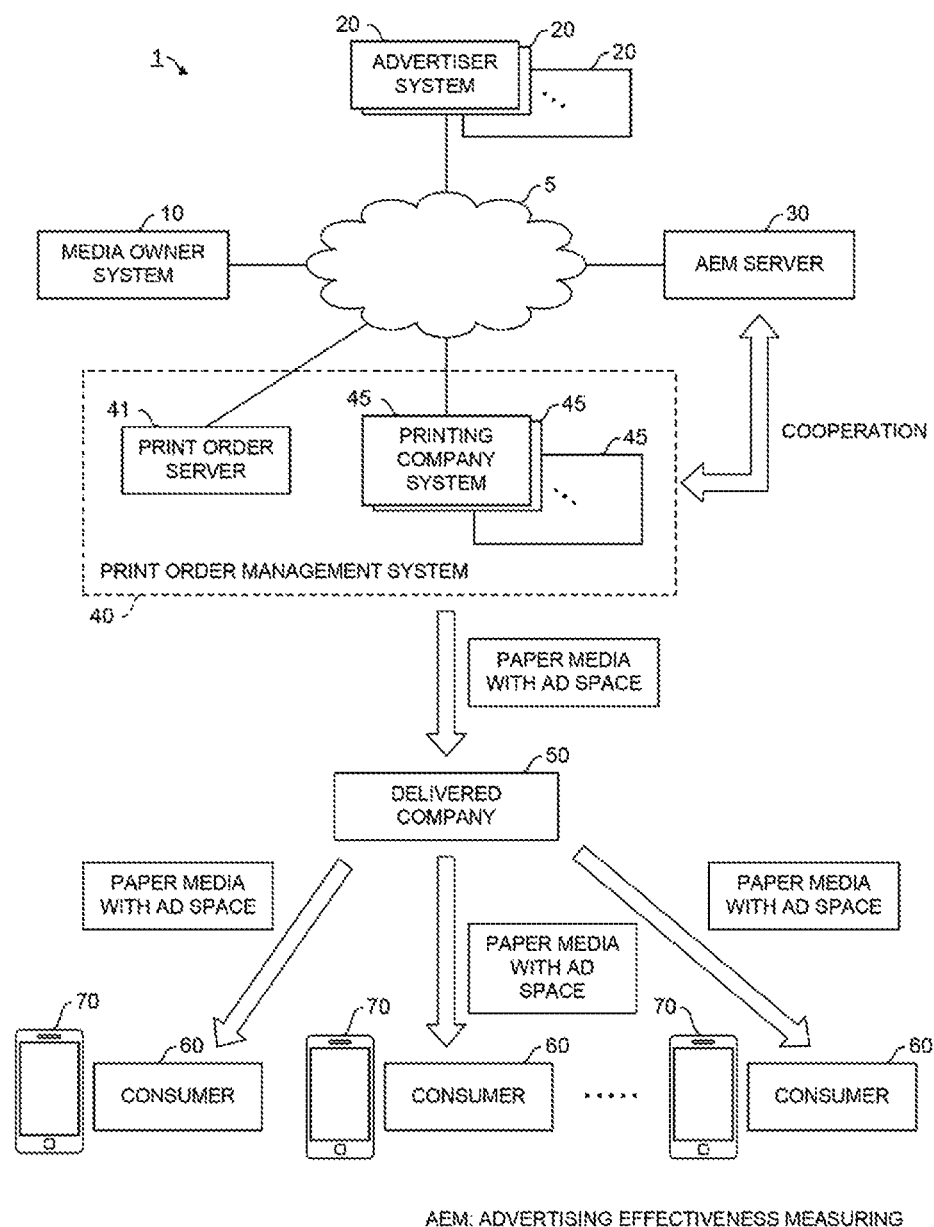
FIG. 1 is a diagram to explain an example of the overall configuration of a paper advertisement system relating to embodiment 1.

FIG. 1 is a diagram illustrating an example of the overall configuration of the paper advertisement system 1 according to the first embodiment. The paper advertisement system 1 depicted in FIG. 1 is composed of plural apparatuses connected to the Internet 5. In the case of FIG. 1, four apparatuses include a media owner system 10 used by a media owner who requests printing of a printed matter; an advertiser system 20 used by an advertiser who desires a media-sharing type advertisement on the printed matter; an advertising effectiveness measuring server 30 to measure the effectiveness of the advertisements that use the printed matter on which advertisements of the media owner and the advertiser are printed; and a print order management system 40 to place an order of printing of the printed matter with one or more printing companies that satisfy conditions presented by the media owner.

The printed matter in the present embodiment refers to an object on which an image such as a picture and a photograph and/or characters are printed on the surface. The printed matter also includes, for example, postcards or flyers, books or magazines, stickers or labels used for attachment, and wrapping paper or containers that wrap or contain other objects. In the present embodiment, the printed matter is not limited to paper. For example, the printed matter may be plastic or a plastic film. Hereinafter, the printed matter is collectively referred to as physical media or print media. When paying attention to the paper, which is an object on which images and/or characters are printed, it may be referred to as paper media. On the paper media in the present embodiment, a QR code or a barcode that leads accesses to a web page (hereinafter, also referred to as "site") established on the Internet 5 is printed. The QR code and barcode here are examples of image codes.

In the case of this embodiment, the media owner refers to a business entity who requests printing of the paper media with advertising spaces and delivery to a delivery destination. The media owner is an example of a first business entity. It is assumed that the paper media with advertising spaces, which is used in the present embodiment, is provided with one or plural advertising spaces for printing advertisements of business entities other than the media owner. The advertising space defines the range of an area for printing the advertisement. However, any paper media requested by the media owner to print is acceptable as long as the media-sharing type advertisement with other business entities is allowed. In the present embodiment, unless otherwise specified, the paper media assumes a direct mail postcard.

In the case of this embodiment, the advertiser refers to a business entity who wishes to place an advertisement in the above-mentioned advertising space. The advertiser is an example of a second business entity. As for the advertiser who are allowed to place the media-sharing advertisement on the paper media for which the media owner orders printing, it is not enough for both the media owner and the advertiser to give permission, and it is required that conditions, which are requested by both parties for the media-sharing type advertisement, are satisfied, and that the attribute information of each consumer 60 to which the paper media is delivered matches the content of the advertisement that the advertiser wants to place. Further, plural advertisers are allowed for one printing request. For example, even if the media owner's advertisement is the same, the advertisement of "Advertiser 1" may be subject to the media-sharing type advertisement for one delivery destination, and the advertisement of "Advertiser 2" may be subject to the media-sharing type advertisement for another delivery destination. As will be described later, media owner advertisements are also personalized for each delivery destination. As described above, in this embodiment, the content of the advertisement printed on the paper media is personalized for each delivery destination.

The advertising effectiveness measuring server 30 in this embodiment is a terminal used by a business entity (hereinafter referred to as "intermediary company") that mediates an order for printing of the paper media by the media owner to the print order management system 40. The advertising effectiveness measuring server 30 in the present embodiment is provided with a function of measuring the effectiveness of the advertisement printed on the paper media. Specifically, the effectiveness of the advertisement of the media owner who requested the printing of the paper media, the effectiveness of the advertisement of the advertiser determined as the partner of the media-sharing type advertisement, and the synergistic effect of the media-sharing type advertisement are measured.

The print order management system 40 in this embodiment is configured by a print order server 41 that automatically determines a factory of a print company suitable for printing paper media ordered through the intermediary company and a printing company system 45 provided in respective factories where one or more printing companies install a printing equipment and a post-finishing device. However, it is not necessary that all elements of the printing company system 45 exist in the factory. For example, a communication device such as a router connected to the Internet 5 or an apparatus for processing information may be provided outside the factory. In the case of this embodiment, all elements of the printing company system 45 need not be present in one country or region, and may be distributed in plural countries or regions. For example, one part of the printing company system 45 may exist in Japan, and another part may exist in the United States of America. The printing company system 45 in this embodiment has a function of transmitting information collected from various terminals connected to the internal network to the print order server 41 according to a prior agreement. Details of this function will be described later.

The printing company in this embodiment should not be limited to a company that specializes in printing. For example, a company who installs a printing equipment and the like in a part of a space used in another business is also treated as a printing company in this embodiment. For this reason, when delivery companies, postal companies, electric power companies, gas companies, public benefit corporations, medical companies, retailers, service providers and the like also install the printing equipment and the like in a part of the space of their places of business, they are included in the printing company in this invention. Further, in the present embodiment, the places of the business and the like in which these business entities have installed the printing equipment and the like are treated as the factories of the printing companies. Further, in the case of this embodiment, a single printing company may manage plural factories. In other words, a single printing company may manage plural print company systems 45 in plural regions. In the case of this embodiment, the scale and capital relationship of the printing companies participating in the paper advertisement system 1 are optional. The printing company does not need to own the printing equipment and the like. That is, the ownership of the printing equipment and the like used by the printing company may be owned by a third party. In the example of FIG. 1, the print order server 41 and the printing company system 45 are collectively described as the print order management system 40, but the business entities of the print order server 41 and the business entities of the printing company system 45 are independent each other. However, the business entity of the print order server 41 and the business entity of the advertising effectiveness measuring server 30 may be the same or have any capital relationship or the like.

In this embodiment, the delivery company 50 refers to a business entity that receives the paper media with the advertising spaces, which is printed by the printing company system 45, and delivers it to the delivery destination printed on the paper media or the like. As described above, since the direct mail postcard is assumed as the paper media with the advertising spaces in this embodiment, the individual paper media with the advertising spaces is delivered to the pertinent consumer 60. The consumer 60 is a natural person or a corporation designated as a delivery destination by the media owner who ordered the printing of the paper media with the advertising spaces. The consumer 60 in this embodiment has a mobile terminal 70 that has a camera that captures the QR code or the like, a display unit used to confirm the captured image and/or display a web page, and a wireless communication function. For the mobile terminal 70, for example, a smartphone, a tablet terminal, or a smart watch is used.

<Configuration of Each System>

The configuration of the system operated by the media owner, advertiser, intermediary company, and printing company which participate in the paper advertisement system 1 will be described below.

<System Configuration on the Media Owner Side>

Figure 2:
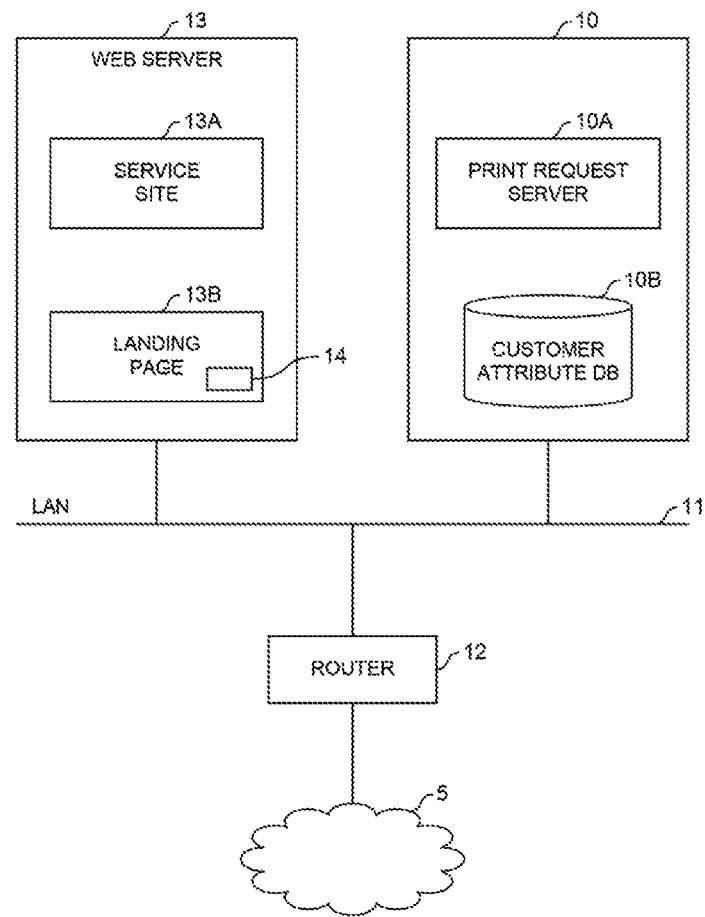
FIG. 2 is a diagram depicting an example of the system configuration on the media owner side used in the embodiment 1.

FIG. 2 is a diagram illustrating an example of the system configuration on the media owner side used in the first embodiment. The media owner system 10 described above is connected to the Internet 5 through a LAN (=Local Area Network) 11 and a router 12. A Web server 13 is also connected on the LAN 11. The web server 13 manages a service site 13A that posts information on products and/or services handled by the media owner, a landing page 13B that is a link destination of the QR code printed on the paper media with the advertising spaces, and other Web pages. However, the landing page 13B may be managed by any terminal on the LAN 11. The landing page 13B here is an example of the first landing page. However, the Web server 13 may be managed or operated by a business entity that provides products and/or services handled by the media owner. That is, the place where the Web server 13 is installed is arbitrary and is not limited to the place of the business of the media owner. The system configuration depicted in FIG. 2 is just an example.

A measurement tag 14 for measuring accesses flowing into the landing page 13B from the QR code printed on the paper media with the advertising spaces is embedded in the landing page 13B. The measurement tag 14 includes a unique character string and the like. The embedding of the measurement tag 14 is realized, for example, by adding predetermined tags to the HTML file of the landing page 13B. The measurement tag 14 in this embodiment is a tag dedicated to the media owner. The measurement tag 14 in this embodiment is generated by the advertising effectiveness measuring server 30 (see FIG. 1) and is given to the media owner in advance.

The media owner system 10 depicted in FIG. 2 includes a print request server 10A and a customer attribute DB (=DataBase) 10B. For example, the print request server 10A is a computer to provide a function to request the advertising effectiveness measuring server 30 (FIG. 1) to print and deliver the paper media with the advertising spaces for which the consumer 60 corresponding to the pertinent event is set as the delivery destination, when the print request server 10A detects the occurrence of an event pertinent to a condition predetermined by the media owner, for example. This function is realized through the execution of a program. In the case of this embodiment, as the predetermined condition, for example, the reservation and/or order for purchase, occurrence of a product that was put in the shopping cart but has not been purchased (so-called shopping cart abandonment), or data request is assumed.

These actions are not limited to accesses to sites on the Internet, but also include the actions of the consumer 60 (see FIG. 1) in physical stores and the like. By the way, the behavior in the physical store that meets the condition predetermined by the media owner include, for example, a reading action of the purchase information of the consumer 60, which is collected through the POS (Point of sales) terminal, or a reading action of the RFID (=Radio Frequency IDentifier) linked to the product or the like. The reading of the RFID includes cases that do not lead to purchase. The terminal used for reading the RFID is not limited to the terminal installed in the physical store, and the mobile terminal 70 (see FIG. 1) operated by the consumer 60 may be used. It should be noted that these events detected by the media owner include information that enables the identification of the consumer 60. This is because the paper media is delivered to a specific consumer 60 as a destination.

The request includes information to identify the consumer 60 as the delivery destination, data of the manuscript image used for printing (hereinafter referred to as "manuscript data"), information on the size of the advertising space provided to the advertiser, and the like. The manuscript image here is prepared for each delivery destination. This is because the products recommended for the consumer 60, which is the delivery destination, are different. The customer attribute DB 10B records a customer's name or title, address or whereabouts, gender, age, past purchase history, and the like.

Figure 3:
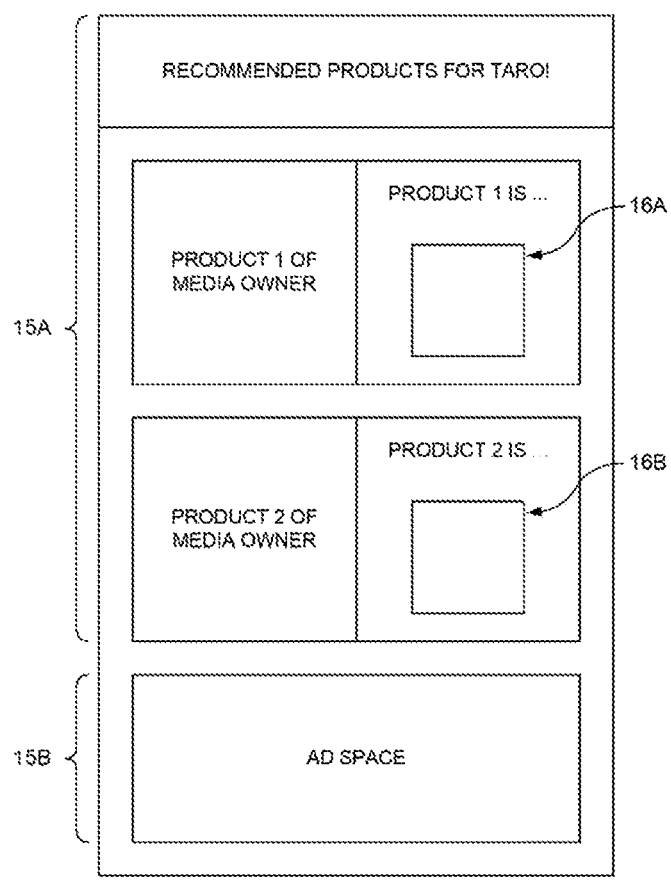
FIG. 3 is a diagram to explain a schematic example of manuscript data transmitted from a print request server to an advertising effectiveness measuring server.

FIG. 3 is a diagram illustrating a schematic example of the manuscript data transmitted from the print request server 10A (see FIG. 2) to the advertising effectiveness measuring server 30 (see FIG. 1). In the case of this embodiment, the manuscript data is generated by the print request server 10A at the time of requesting printing of the direct mail postcard or the like. However, the template of the manuscript data may be registered in the advertising effectiveness measuring server 30. In that case, the print request server 10A may transmit the information for specifying the template of the manuscript data to be requested and/or image information of the product, which is to be inserted, to the advertising effectiveness measuring server 30.

In the case of FIG. 3, the area 15A, which downwardly occupies about two-thirds from the upper end of the direct mail postcard, is used for advertisements of the media owner, and the area 15B, which upwardly occupies about one-third from the lower end, is used as the advertisement space provided for the advertiser. In the case of this embodiment, the delivery destination has been determined by the time of requesting the printing of the direct mail postcard. Therefore, the schematic depiction of the manuscript data, which is depicted in FIG. 3, includes a description of "for Taro" representing the delivery destination. In this way, the schematic depiction of the manuscript data is personalized for each delivery destination. In the case of FIG. 3, as "Recommended products for Taro!", images of the products 1 and 2 and their explanations and the like are arranged in the area 15A. Product 1 and product 2 are both products advertised by the media owner. Product 1 and product 2 are products posted on the landing page to which Mr. Taro is led. Therefore, if the delivery destination is different, the content of the manuscript data will be different. In this sense, the landing page to which the delivery destination is led may be different for each delivery destination.

Furthermore, in the areas of the descriptions corresponding to the product 1 and the product 2, blanks 16A and 16B for printing the QR codes for leading to the landing pages 13B (see FIG. 2) corresponding to respective products are provided, respectively. The image of the service may be arranged in place of the images of the product 1 and the product 2. The landing page 13B that is led from the QR code printed in the blank 16A and the landing page 13B that is led from the QR code printed in the blank 16B may be different. For example, the landing page 13B that is led from the QR code printed in the blank 16A may be the page of company A, and the landing page 13B that is led from the QR code printed in the blank 16B may be the page of company B. Company A and Company B here are assumed to be business entities different from the media owner, but may be the media owner itself. As will be described later, the QR code that leads to the landing page 13B is generated by the advertising effectiveness measuring server 30 (see FIG. 1). In the example of FIG. 3, there is one area 15B corresponding to the advertising space, but there may be plural areas 15B corresponding to the advertisement spaces. The advertisement space is blank at the time of requesting the printing.

<System Configuration on the Advertiser Side>

Figure 4:
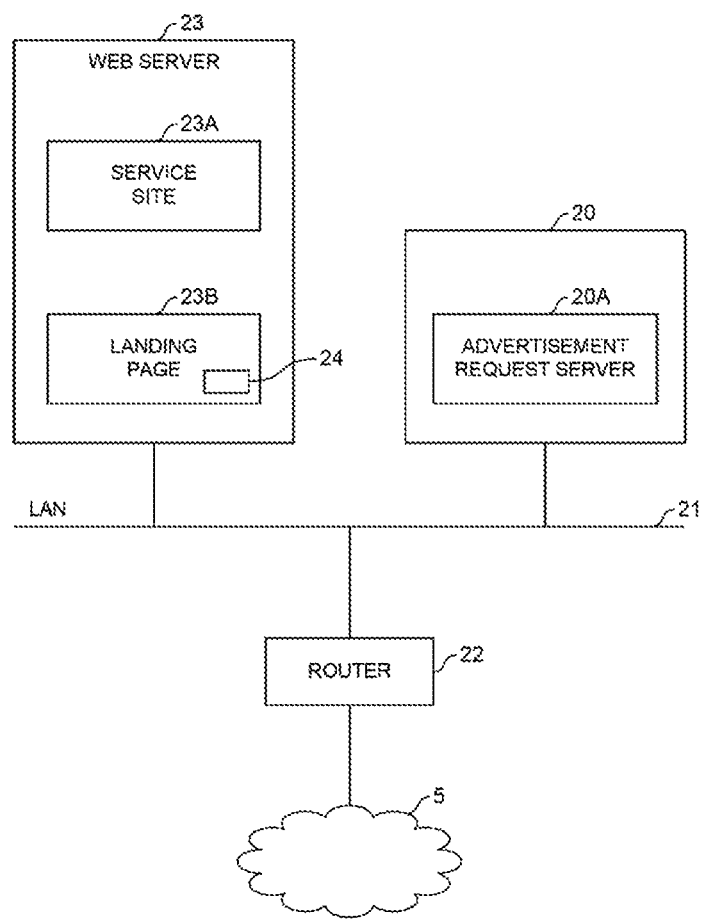
FIG. 4 is a diagram depicting an example of the system configuration on the advertiser side used in the embodiment 1.

FIG. 4 is a diagram depicting an example of the system configuration on the advertiser side used in the first embodiment. The advertiser system 20 is connected to the Internet 5 through the LAN 21 and a router 22. A Web server 23 is also connected on the LAN 21. The Web server 23 manages a service site 23A that posts information about products and/or services handled by the advertiser, a landing page 23B that is a link destination of the QR code printed on the paper media with the advertising spaces, and other Web pages. In the case of this embodiment, the landing page 23B is managed by any terminal on the LAN 21. The landing page 23B here is an example of a second landing page. The advertiser system 20 and the Web server 23 do not have to be connected to the same LAN 21, and may be connected via the Internet 5. Further, the Web server 23 may be managed or operated by a business entity different from the advertiser.

That is, the place where the Web server 23 is installed is arbitrary and is not limited to the place of business of the advertiser. The system configuration depicted in FIG. 4 is just an example.

A measurement tag 24 for measuring accesses flowing into the landing page 23B from the QR code printed on the paper media with the advertising spaces is embedded in the landing page 23B. The measurement tag 24 includes a unique character string and the like. The measurement tag 24 in this embodiment is a tag dedicated to the advertiser. Therefore, the content of the measurement tag 24 is different from that of the measurement tag 14 for the media owner (see FIG. 2). The measurement tag 24 in this embodiment is also generated by the advertising effectiveness measuring server 30 (see FIG. 1) and is given to the advertiser in advance.

The advertiser system 20 depicted in FIG. 4 includes an advertisement request server 20A. The advertisement request server 20A is a computer that manages, for example, advertisement articles to be placed in advertisement spaces, conditions regarding a desired advertisement destination, and the like. The advertisement article here may be prepared according to the size of the advertisement space and the like. In addition, the conditions regarding the desired advertisement destination include the industry type of the media owner, the type of product or the like for which the media-sharing is desired, the budget for the media-sharing type advertisement, and information on the attributes of the delivery destination. The advertisement article and the conditions regarding the desired advertisement destination are registered in advance in the advertising effectiveness measuring server 30.

<System Configuration of Advertising Effectiveness Measuring Server>

The configuration example of the advertising effectiveness measuring server 30 (see FIG. 1) operated by the intermediary company will be described below with reference to FIGS. 5 to 8. The advertising effectiveness measuring server 30 is an example of an advertising effectiveness measuring system.

Figure 5:
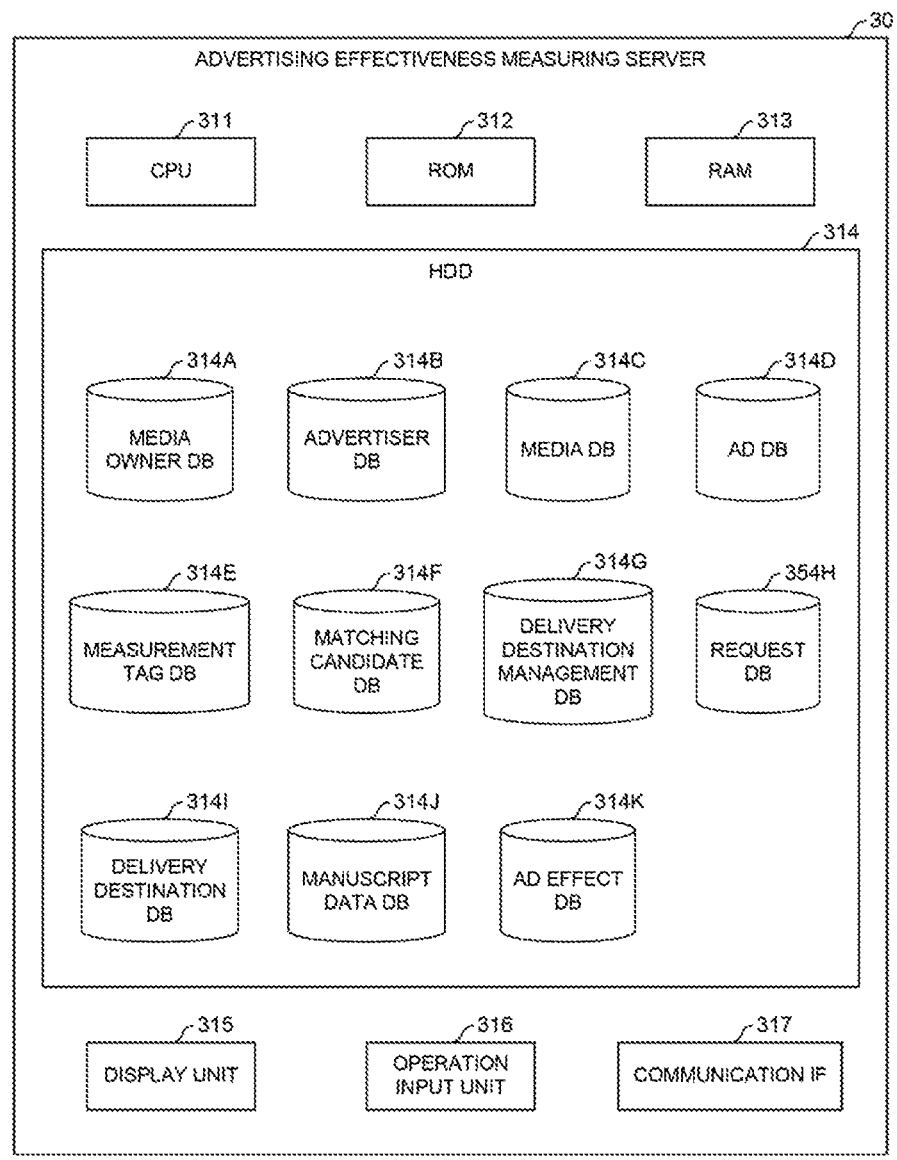
FIG. 5 is a diagram depicting a hardware configuration example of the advertising effectiveness measuring server used in the embodiment 1.

FIG. 5 is a diagram depicting a hardware configuration example of the advertising effectiveness measuring server 30 used in the first embodiment. As depicted in FIG. 5, the advertising effectiveness measuring server 30 has a CPU (=Central Processing Unit) 311 that controls the entire apparatus through execution of programs (including basic software), a ROM (=Read Only Memory) 312 that stores a BIOS (=Basic Input Output System), and the like, and a RAM (=Random Access Memory) 313 used as an execution area of the programs. The CPU 311, ROM 312, and RAM 313 constitute a so-called computer and execute various types of information processing. The ROM 312 is composed of, for example, a non-volatile semiconductor memory. The CPU 311 is an example of a processor.

The hard disk device (=HDD) 314 stores basic software, a program for generating manuscript data of the printed matter that enables measurement of the effectiveness of the media-sharing type advertisement, a program for measuring the effectiveness of the media-sharing type advertisement, information used for generating the manuscript data, measurement data of the advertising effectiveness, which is obtained respectively from the media owner and the advertiser, and the like. The hard disk device 314 depicted in FIG. 5 stores a media owner DB 314A, advertiser DB 314B, media DB 314C, advertisement (ad) DB 314D, measurement tag DB 314E, matching candidate DB 314F, delivery destination management DB 314G, request DB 314H, delivery destination DB 314I, manuscript data DB 314J, and advertisement (ad) effect DB 314K. However, a part or all of the various databases depicted in FIG. 5 may be stored in a database server prepared independently of the advertising effectiveness measuring server 30.

The media owner DB 314A is a database that manages media owners participating in the paper advertisement system 1 (see FIG. 1). The media owner DB 314A stores, for example, the name, address or whereabouts, transaction results of the media owner, and the like. The advertiser DB 314B is a database that manages advertisers who participate in the paper advertisement system 1. The advertiser DB 314B stores, for example, the name, address or whereabouts, transaction results of the advertiser, and the like. The media DB 314C is a database that stores print requests, which were received from the media owner system 10, and pre-registered information (see FIG. 1). The media DB 314C stores, for example, information on the paper media, sizes of the advertisement spaces, information on attributes of delivery destinations, URL (=Uniform Resource Locator) of the landing page for measuring inflow from the QR code, and the like. In the case of this embodiment, the information on the paper media includes, for example, the type of the paper media, the media owner who is a requesting source, the size of the paper media, the number of copies to be printed, and the frequency of delivery. Information on the attributes of the delivery destinations includes the gender, age, address or whereabouts, area, and other personal attributes of the consumer 60 (see FIG. 1), attributes as a set of delivery destinations, the number of delivery destinations, and the like.

The advertisement DB 314D is a database that stores information registered in advance through the advertiser system (see FIG. 1). The advertisement DB 314D stores, for example, an advertisement article, the conditions regarding the desired advertisement destination, the URL of the landing page for measuring inflow from the QR code, and the like. In the case of this embodiment, the conditions regarding the desired advertisement destination include the desired media owner and/or industry type, the type of paper media, the size of the advertisement space, the unit price of the advertisement, the attributes of the desired delivery destinations, and the like. The attributes of the delivery destinations include, for example, gender, age group, and region to which the delivery destination belongs. The measurement tag DB 314E is a database that stores a measurement tag generated for each landing page for measuring advertising effectiveness. The generated measurement tag is distributed in advance to the business entity that manages or operates the landing page. In the case of this embodiment, the measurement tag is distributed in advance to the media owner system 10 and the advertiser system 20. The matching candidate DB 314F is a database that stores advertiser candidates who may be a media-sharing advertiser for the paper media requested by the media owner to print. This database also stores information on advertisers who is allowed and is not allowed for the media-sharing type advertisement by the media owner, and information on the paper media that advertisers desire and do not desire the media-sharing type advertisement.

The delivery destination management DB 314G is a database used by the intermediary company to manage the delivery destinations of the paper media requested by the media owner. The delivery destination management DB 314G may store, for example, the name or title, and address or whereabouts of the delivery destination, which are included in the request of the media owner. However, the name or title may be removed, and only the address or whereabouts may be stored in the delivery destination management DB 314G. The request DB 314H is a database used for managing requests from the media owner. The request DB 314H stores, for example, the date and time when the request was received, the name of the media owner, the type of the paper media, the size of the paper media, the number of copies, the size of the advertisement space, the name of the delivery destination, the address or whereabouts of the delivery destination, the desired date and time of delivery, and the like.

The delivery destination DB 314I is a database that stores identification information for each delivery destination, which is generated to enable the measurement of the effectiveness of the media-sharing type advertisement. In the case of this embodiment, one piece of the identification information is generated for one delivery destination. The identification information may be referred to as a target ID in order to specify the delivery. Incidentally, when it is desired to distinguish the identification information between the media owner and the advertiser, the identification information for the media owner is referred to as the first identification information, and the identification information for the advertiser is referred to as the second identification information. However, in this embodiment, the identification information of the delivery destination is not distinguished between the media owner and the advertiser, and the common identification information is used. Therefore, the identification information in this embodiment is an example of the first identification information and also an example of the second identification information.

The manuscript data DB 314J is a database that stores dedicated manuscript data for each delivery destination. In other words, the manuscript data is personalized for each delivery destination. The manuscript data here includes the manuscript data provided by the media owner, information to identify the delivery destination, the QR code that leads to the landing page of the media owner, an advertisement article provided by the advertiser, the QR code that leads to the landing page of the advertiser, and the like. The QR code also includes information on the aforementioned identification information. By including the information on the identification information, it becomes possible to analyze the media-sharing type advertisement by the advertising effectiveness measuring server 30. The advertisement (ad) effect DB 314K is a database that stores information on the measurement of the advertising effectiveness. The advertisement effect DB 314K includes information on the measurement of the accesses that flow into the landing page of the media owner from the QR code, information on the measurement of the accesses that flow into the landing page of the advertiser from the QR code, and information on the mutual relationship measured through the identification information. The access to the landing page is measured through each of the measurement tag 14 (see FIG. 2) and the measurement tag 24 (see FIG. 4), and is notified to the advertising effectiveness measuring server 30. In addition, the advertising effectiveness measuring server 30 includes a display unit 315 used to display an operation screen of the program executed by the CPU 311, an operation input unit 316 used for inputs by an operator who operates the operation screen, and a communication IF 317 used for communication with the Internet 5 (See FIG. 1). The display unit 315 and the operation input unit 316 here may be externally attached to the housing of the advertising effectiveness measuring server 30.

Figure 6A:
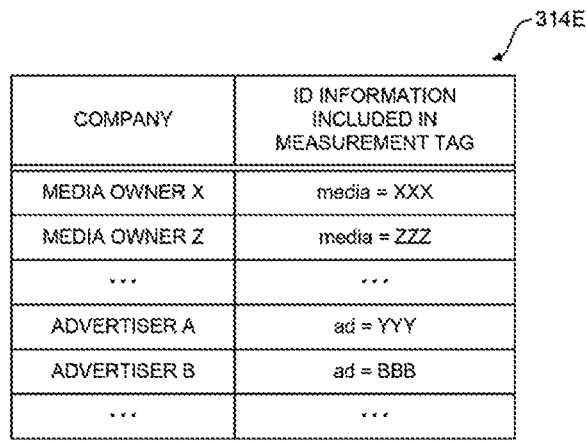
FIG. 6A is a diagram depicting a data structure example of a measurement tag DB used in the embodiment 1.
Figure 6B:
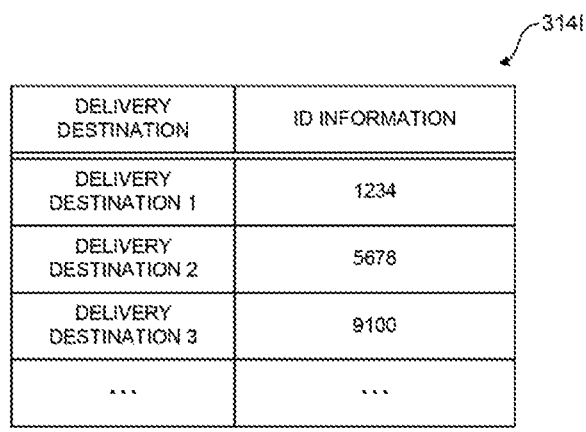
FIG. 6B is a diagram depicting a data structure example of a delivery destination DB used in the embodiment 1.

FIGS. 6A and 6B are diagrams to explain a data structure example of the measurement tag DB 314E and the delivery destination DB 314I used in the first embodiment. FIG. 6A is an example of the data structure of the measurement tag DB 314E, and FIG. 6B is an example of the data structure of the delivery destination DB 314I. In the case of FIG. 6A, the identification information (also referred to as a key) included in the measurement tag is registered for each business entity. For example, the key "media=XXX" is registered for the media owner X, and the key "media=ZZZ" is registered for the media owner Z. Furthermore, for example, the key "ad=YYY" is registered for the advertiser A, and the key "ad=BBB" is registered for the advertiser B. The measurement tag corresponding to the media owner is an example of the first tag, and the measurement tag corresponding to the advertiser is an example of the second tag. However, the measurement tag may be registered not for each business entity but for each landing page of each business entity and/or advertising campaign unit. On the other hand, as described above, the identification information of the delivery destination in this embodiment is registered for each delivery destination. For example, "1234" is registered for the delivery destination 1, "5678" is registered for the delivery destination 2, and "9100" is registered for the delivery destination 3. Of course, these are examples, and the length of the character string of the identification information included in the measurement tag and the length of the character string of the identification information are arbitrary. In addition, different types of alphanumeric characters may be mixed in the character string.

Figure 7A:
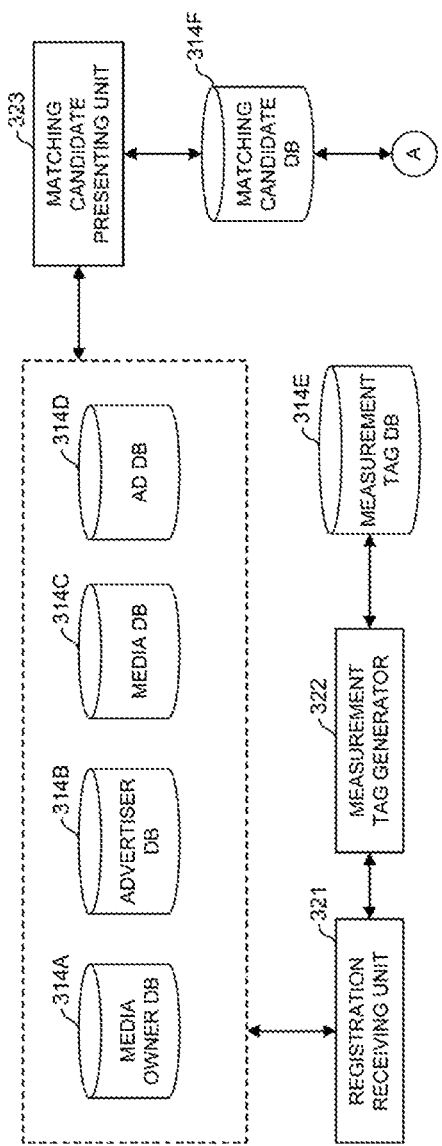
FIG. 7A is a diagram depicting a portion of a functional configuration example of the advertising effectiveness measuring server used in the embodiment 1.
Figure 7B:
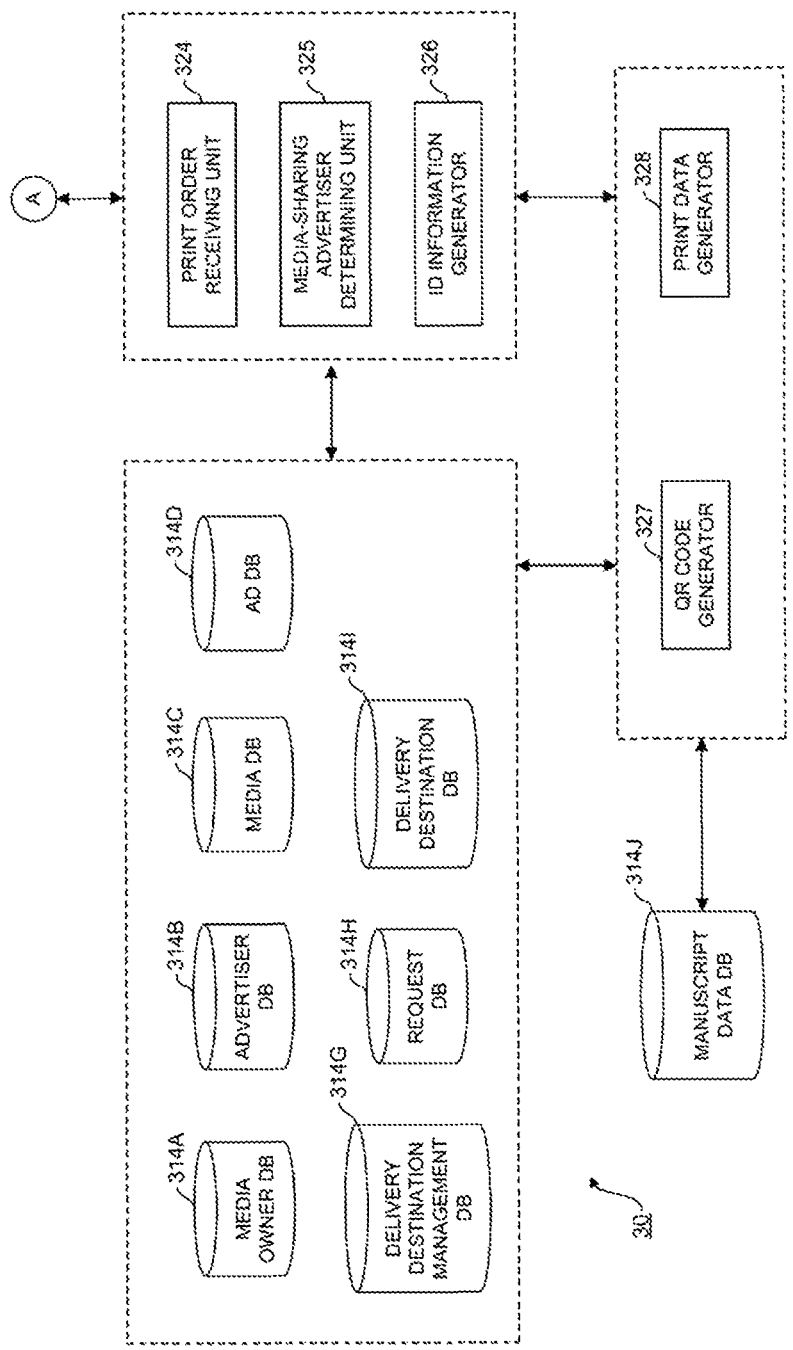
FIG. 7B is a diagram depicting a portion of the functional configuration example of the advertising effectiveness measuring server used in the embodiment 1.

FIGS. 7A and 7B are diagrams depicting a portion of a functional configuration example of the advertising effectiveness measuring server 30 used in the first embodiment. The functional portions depicted in FIGS. 7A and 7B correspond to the processing up to the generation of the print data of the paper media, which includes the media-sharing type advertisements of the media owner and the advertiser. Each functional unit is realized through the execution of the program by the computer. The registration receiving unit 321 is a program that provides a function of registering information received from media owners and advertisers who wish to participate in the paper advertisement system 1 (see FIG. 1) in a corresponding database. The information received by the registration receiving unit 321 is stored in, for example, the media owner DB 314A, the advertiser DB 314B, the media DB 314C, and the advertisement DB 314D. The measurement tag generator 322 is a program that generates a measurement tag used for measuring the accesses flowing into the landing page from the QR code. The measurement tag generator 322 generates a measurement tag unique to each business entity participating in the paper advertisement system 1. In other words, the measurement tag generator 322 generates a unique measurement tag for each of the media owner and the advertiser. In the case of this embodiment, the measurement tag is generated for each business entity, but may be generated for each individual campaign. The generated measurement tag is stored in the measurement tag DB 314E.

The matching candidate presenting unit 323 is a program that presents candidates for the media-sharing type advertisement to the other party in advance based on the registered information about the media owner and the registered information about the advertiser. However, the presentation by the matching candidate presenting unit 323 is performed in a case where the presentation of the candidates for the media-sharing type advertisement is desired. For example, the candidates of the advertisers that may place the advertisement on the advertisement space are presented for the media owner. In addition, the candidates of the media owners that provide the advertisement space for which the advertisement may be placed are presented for the advertiser. The combinations of the media owner and the advertiser are stored in the matching candidate DB 314F as matching candidates. The matching candidate presenting unit 323 receives responses from the media owner and the advertiser, which relate to whether or not to allow the media-sharing type advertisement with the presented candidate, and stores them in the matching candidate DB 314F. The stored information regarding the allowability can be changed after the fact.

The print order receiving unit 324 is a program that receives orders for printing and delivery of the paper media by the media owner system 10 (see FIG. 1). The print order receiving unit 324 stores the information associated with the received order in the request DB 314H. The information here includes, for example, the name or title of the media owner as a requester, the type of the paper media, the size of the paper media, the manuscript data, the number of copies, the size of the advertisement space, the name or title of the delivery destination, the address or whereabouts of the delivery destination, other attribute information about the delivery destination, which is used to determine the delivery destination that is desired for the advertiser to place the advertisement on the advertisement space, and the desired delivery date and time. However, the name or title of the media owner, the type of the paper media, the size of the paper media, the manuscript data, the number of copies, and the size of the advertisement space may be obtained from the media DB 314C. The media-sharing advertiser determining unit 325 is a program that determines an appropriate advertiser in real time for each combination of the media owner, paper media, and delivery destination. First, the media-sharing advertiser determining unit 325 refers to the matching candidate DB 314F to extract advertisers for which the media owner who is the requester of the printing and delivery of the paper media does not allow the media-sharing, and to further exclude advertisers that do not allow to place the advertisement on the advertisement space provided by the media owner that is the requester, from among the extracted advertisers. By this processing, the advertisers who can place the media-sharing type advertisement with the media owner who is the requester remain.

Next, the media-sharing advertiser determining unit 325 determines the media-sharing advertiser for each delivery destination by using the conditions regarding the desired advertisement destination registered for the advertisers capable of the media-sharing type advertisement and the like. For example, the delivery destinations specified by the media owner are dispersed throughout Japan, but the conditions for the advertisement destinations desired by the advertiser may include regional restrictions. In this case, different advertisers may be determined for each region. When plural advertisers are candidates for a certain delivery destination, one advertiser is determined based on a predetermined method. As a method of determining one advertiser, for example, there are a method of determining an advertiser with a high priority designated by a media owner and a method of giving priority to an advertiser having a high advertisement unit price. The advertisement unit price is calculated based on, for example, a unit price model according to the number of conditions specified by the advertiser. If the advertiser is not determined, a fixed design or the like prepared in advance by the media owner is inserted into the area 15B reserved as the advertisement space. The information on the advertiser determined for each delivery destination is stored in, for example, the delivery destination management DB 314G and/or the request DB 314H together with the information of the media owner who is the requester.

The identification information generator 326 is a program that generates identification information for each delivery destination designated by the media owner. In this embodiment, the identification information is generated for the newly designated delivery destination, and the previously generated identification information is used as it is for the delivery destination that has been previously specified. The generated identification information is stored in the delivery destination DB 314I. The QR code generator 327 is a program that generates a QR code whose link destination is a landing page prepared for each business entity. The QR code generator 327 is an example of a first code generator and a second code generator. When the QR code generator 327 is distinguished by the business entity, the QR code generator 327 that generates the QR code for the media owner is called the first code generator, and the QR code generator 327 that generates the QR code for the advertiser is called the second code generator. The QR code for the media owner includes the URL of the landing page specified by the media owner, the ID unique to the paper media on which the QR code is printed (hereinafter referred to as the "media ID"), and the identification information unique to the delivery destination. In addition, the QR code for the advertiser includes the URL of the landing page specified by the advertiser determined as the media-sharing advertiser for the direct mail postcard delivered to the specific delivery destination, media ID (=Identifier), and identification information unique to the delivery destination.

The print data generator 328 is a program that generates print data for each delivery destination. Here, in addition to the manuscript data for each delivery destination, which is provided by the media owner, the QR code for the media owner generated for each delivery destination, the advertisement article of the media-sharing advertiser determined for each delivery destination, and the QR code for the media-sharing advertiser, which was generated for each delivery destination, are added to the print data. This print data is generated so as to include the QR code for the media owner and the QR code for the media-sharing advertiser, which were generated for the same delivery destination. The generated print data is stored in a print data DB (not depicted).

Figure 8:
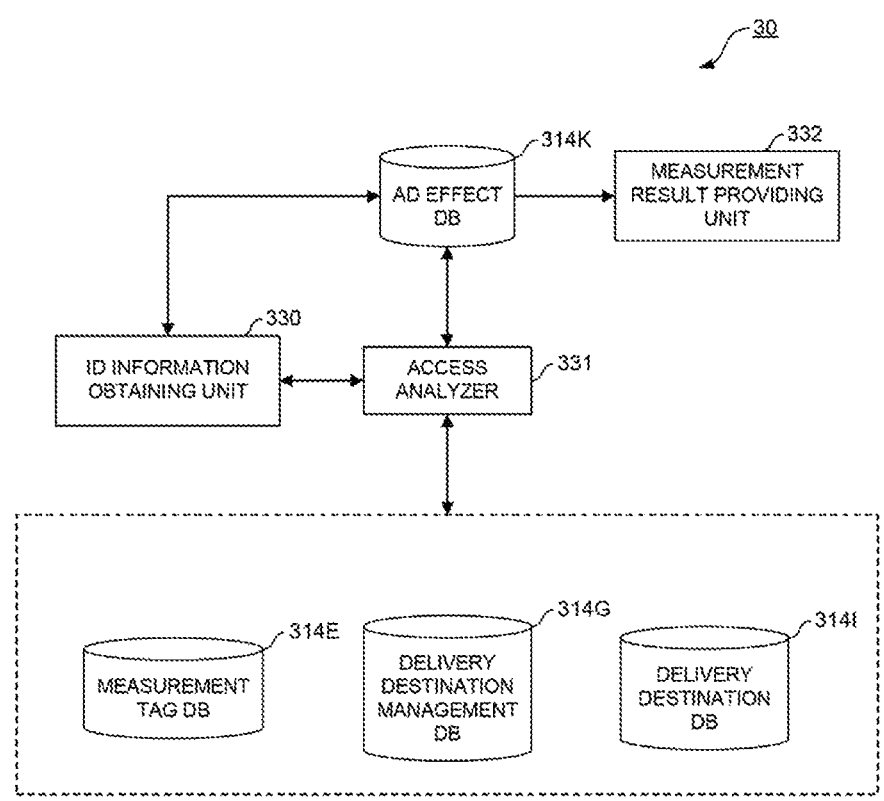
FIG. 8 is a diagram depicting a portion of the functional configuration example of the advertising effectiveness measuring server used in the embodiment 1.

FIG. 8 is a diagram depicting a portion of a functional configuration example of the advertising effectiveness measuring server 30 used in the first embodiment. The functional portion depicted in FIG. 8 corresponds to a process of measuring the inflow from the QR code printed on the delivered paper media to each landing page. Each functional unit is realized through the execution of the program by the computer. The identification (ID) information obtaining unit 330 is a program to obtain results of measuring accesses to the landing page, which occur by the mobile terminal 70 (see FIG. 1) scanning the QR code printed on the direct mail postcard, from the media owner system 10 (see FIG. 1) and the advertiser system 20 (see FIG. 1), respectively. As described above, the access to the landing page 13B (see FIG. 2) of the media owner system 10 is measured through the measurement tag 14 (see FIG. 2) embedded in the page. In addition, the access to the landing page 23B (see FIG. 4) of the advertiser system 20 is measured through the measurement tag 24 (see FIG. 4) embedded in the page.

When the measurement tags 14 and 24 in this embodiment detect an access to the landing page, they measure and store the media ID unique to the paper media on which the QR code used for the access is printed and the identification information unique to the delivery destination. These pieces of information are information used for generating the QR code, and are included as information to designate the URL of the access destination when the QR code is scanned. The identification information obtaining unit 330 in this embodiment individually obtains the measured information each time a new access to the landing page to be measured is detected. The information obtained by the identification information obtaining unit 330 also includes information on the date and time when each access was detected. The identification information obtaining unit 330 in this embodiment provides the obtained information for the access analyzer 331 and stores it in the advertisement effect DB 314K. The identification information obtaining unit 330 here is an example of a first obtaining unit and a second obtaining unit. When the identification information obtaining unit 330 is distinguished by the business entity, the identification information obtaining unit 330 for the media owner is referred to as the first obtaining unit, and the identification information obtaining unit 330 for the advertiser is referred to as the second obtaining unit.

The access analyzer 331 is a program that analyzes the advertising effectiveness by the delivered direct mail postcard based on the information obtained by the identification information obtaining unit 330. For example, the access analyzer 331 counts the number of accesses flowing into each landing page from the QR code printed on the delivered direct mail postcard based on the information of the media ID. The counted information is statistical information and does not include personally identifiable information. However, it is possible to count the number of accesses corresponding to a specific attribute by using the information related to the individual attribute such as gender and/or age, which are associated with the identification information. Since the number of delivery destinations is known, the access rate may be calculated. Incidentally, the identification information obtained together with the media ID may be used to keep records of accessed landing pages for each individual. Furthermore, for example, the access analyzer 331 utilizes the identification information unique to the delivery destination to count the number of accesses to both the media owner's landing page 13B (see FIG. 2) and the advertiser's landing page 23B (see FIG. 4) from the same delivery destination. In the case of this embodiment, since there is only one identification information for the delivery destination, the number of accesses whose media ID and identification information are common is counted among the information obtained from the media owner system 10 and the information obtained from the advertiser system 20. This information is statistical information and does not include personally identifiable information. In this case, the identification information may be used to record the delivery destinations that visited both landing pages.

Since the number of delivery destinations is known, the access rate of the delivery destinations that accessed both landing pages may be calculated. Here, for the number of deliveries that gives the denominator of the access rate, for example, the total number for each combination of the media owner and the advertiser who is the partner of the media-sharing type advertisement is used. Furthermore, the total number obtained by taking into account the combination of the delivery destination areas and/or the delivery destination attributes may be used. By making the conditions used for analysis more detailed, it is possible to increase the analysis worth of the effectiveness of the media-sharing type advertisement. In the case of this embodiment, the conditions used for the analysis are specified by the advertising effectiveness measuring server 30 (see FIG. 1), but may be specified by the media owner and/or the advertiser.

Furthermore, for example, the access analyzer 331 also utilizes the information on the date and time when the access is detected to count the number of persons who access the landing page 13B of the media owner earlier than the access to the landing page 23B of the advertiser, and the number of persons who access the landing page 23B of the advertiser earlier than the access to landing page 13B of the media owner. Also in this case, the ratio to the total number for each combination of the media owner and the advertiser who is the partner of the media-sharing type advertisement, and the ratio to the total number that is the number of persons who have accessed both may be calculated. Furthermore, as for the before and after relationship between the accesses, the total number obtained by taking into account the combination of the delivery destination areas and/or the delivery destination attributes may be used. Of course, the conditions used for the analysis may be specified not only by the advertising effectiveness measuring server 30 but also by the media owner and/or the advertiser.

If plural advertisement spaces are placed on one direct mail postcard, and a different advertiser's advertisement article is printed on each advertisement space, the number or ratio of persons who access the landing pages of the plural business entities, and the number or ratio of persons obtained by focusing on the before and after relationship between the accesses may be calculated for the media owner and plural advertisers who relates to the media-sharing type advertiser. The results of these analyzes are stored in the advertisement effect DB 314K. The access analyzer 331 in this embodiment analyzes the accesses as statistical information, but if the consent of the individual is obtained, it is possible to include individual attributes such as gender and age into the analysis results. The measurement result providing unit 332 is a program that presents the measurement results of advertisements related to both the media owner and the advertiser who is the partner of the media-sharing type advertisement for both in the form of a report or the like. In the report here, the results of the analysis, which are read from the advertisement effect DB 314K, are described. The results of the analysis described in the report may be specified by the advertising effectiveness measuring server 30, or may be specified by the media owner and/or the advertiser.

<Configuration of Print Order Management System>

Next, using FIGS. 9 to 13, configuration examples of the print order server 41 (see FIG. 1) and the printing company system 45 (see FIG. 1), which constitute the print order management system 40, will be explained.

<Configuration of Print Order Server>

Figure 9:
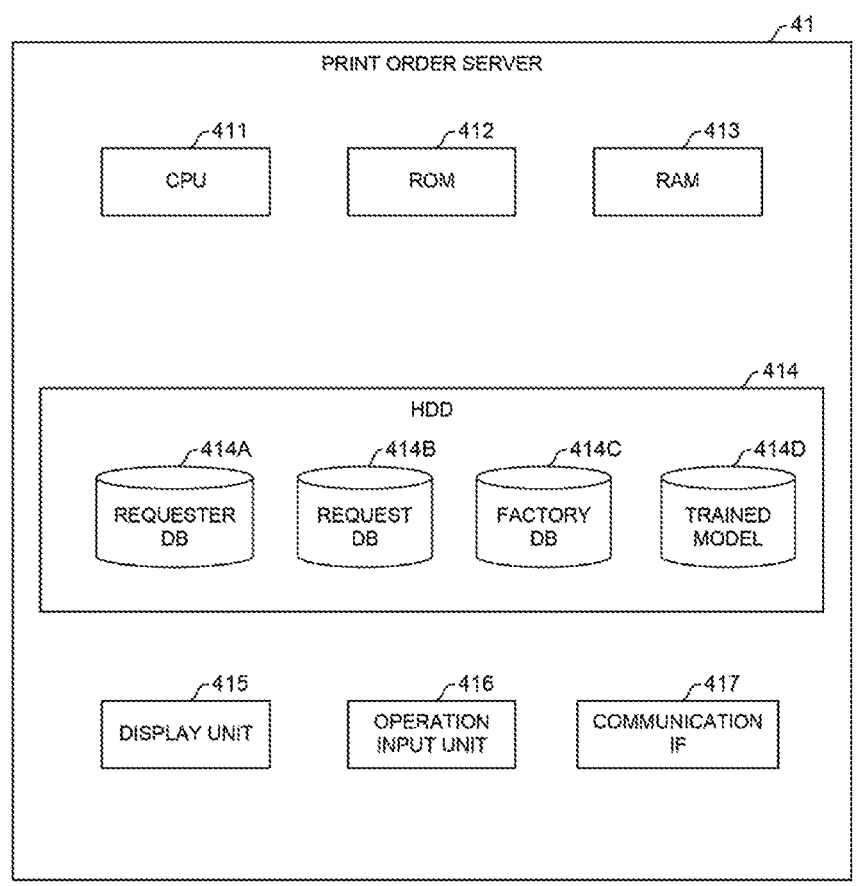
FIG. 9 is a diagram depicting a hardware configuration example of the print order server used in the embodiment 1.

The print order server 41 in this embodiment is a server that receives an order for printing of the paper media and delivery of the paper media to the delivery destination through the advertising effectiveness measuring server 30, and automatically places an order of the printing and the like with an appropriate printing company. However, the advertising effectiveness measuring server 30 merely mediates the order of the media owner to the print order server 41. Therefore, the printing and delivery of the paper media ordered by the print order server 41 is caused by the order of the media owner. FIG. 9 is a diagram depicting a hardware configuration example of the print order server 41 used in the first embodiment. As depicted in FIG. 9, the print order server has a CPU 411 that controls the entire apparatus through execution of programs (including basic software), a ROM 412 that stores a BIOS and the like, and a RAM 413 that is used as a program execution area. The CPU 411, ROM 412, and RAM 413 constitute a so-called computer and execute various types of information processing. The ROM 412 is composed of, for example, a non-volatile semiconductor memory. The CPU 411 is an example of a processor.

The hard disk device (=HDD) 414 stores a basic software, a program that analyzes information uploaded from the printing company system 45, a program that determines a printing company system 45 that satisfies the printing conditions specified by the media owner, the information to manage the ordered printing request, the information about each printing company system 45, and the like. In this embodiment, artificial intelligence is used to analyze the information. However, it may be a program that analyzes information according to predetermined rules. The information to manage the ordered printing request includes, for example, the order ID, information about the requester, conditions for requesting the printing company system 45 to print, information about print data, billing ID, information about the billing, the state of progress of the ordered printing and the like. Here, the requester is the media owner. Therefore, all the information about the requester, which will be described below, is the information about the media owner.

In the case of FIG. 9, the information about the requester is stored in the requester DB 414A. In addition, the information such as the conditions for requesting the printing company system 45 to print, information about billing, and the state of progress of the ordered printing is stored in the request DB 414B. The requester DB 414A and the request DB 414B are stored in a part of the storage area of the hard disk device 414. In the case of this embodiment, the information to manage the printing request is given to the print order server 41 from the advertising effectiveness measuring server 30 (see FIG. 1). The information about the requester here includes, for example, a code for identifying the requester (for example, a customer ID), the name of the requester, the place of residence or location of the requester, information about the person in charge on the requester side, the contact information of the requester, requester's industry type, the management number prepared for each customer on this service, billing information and the like.

The conditions specified at the time of the request include, for example, the desired deadline for delivery, the desired printing company, the desired factory, the country or region where the printing is performed, the desired application, the desired amount of money, the desired delivery method, the desired paper type, the paper weight, the desired color profile, the desired production quantity, the finished size, the designation of single-sided or double-sided printing, the finishing type, the designation of the document layout section, the product form, the distinction of single or multiple products, and the like. The application here is used to specify the type of paper media such as direct mail and books. The product form may be, for example, books, postcards, flyer, business cards, tickets, catalogs, slips, envelopes, stickers, labels, bags, boxes (packages), and the like. Information about the print data includes, for example, print data, a file format of the print data, and the like.

In the case of this embodiment, the information received from the individual printing company system 45 (see FIG. 1) is stored in the factory DB 414C, which is a part of the storage area of the hard disk device 414. New information uploaded from the printing company system 45 is automatically stored and updated in the factory DB 414C. The factory DB 414C also records information calculated by the print order server 41 based on the information uploaded from the printing company system 45. The information calculated based on the information uploaded from the printing company system 45 includes, for example, information about the evaluation of the quality of the paper media printed at the factory where the printing company system 45 is installed, the past state and/or current state of the factory where the printing company system 45 is installed, the production capacity calculated from the past performance, the predicted schedule, and the like.

In addition, registration information such as the location and business days of the factory where the printing company system 45 is installed is also recorded in the factory DB 414C. The registration information here is so-called static information that does not change with the passage of time. In addition, the evaluation of each factory by the media owner who is the requester of the printing, the evaluation of each factory by the intermediary company, the record regarding delays in the past deadline for delivery, the record regarding the quality failure confirmed for the past delivery, and the like are also recorded.

In the case of this embodiment, artificial intelligence is also used to calculate this information. However, a program that calculates information according to a predetermined rule may be used. As will be described later, whenever new data is generated or a change in the phenomenon is detected, the printing company system 45 uploads such information to the print order server 41. Therefore, the information in the factory DB 414C reflects the situation in the factory corresponding to the printing company system 45 in real time. In other words, the information in the factory DB 414C and the situation in the factory where the printing company system 45 is installed are in a synchronous relationship.

In the example of FIG. 9, the factory DB 414C is stored in the hard disk device 414, but the factory DB 414C may be arranged on the cloud server. When storing in the cloud server, the print order server 41 and the factory DB 414C do not have to exist in the same country or region, and may be distributed in different countries or regions. Furthermore, the hard disk device 414 stores a trained model 414D of the order relationship used when determining an order destination that satisfies the conditions specified by the media owner who is the requester of the printing. The trained model 414D provides rules for determining an order destination that meets the printing conditions from among the individual factories managed in the factory DB 414C. In the case of the present embodiment, the trained model 414D is continually updated by the artificial intelligence that learns the records about stored orders, registration and/or update of the evaluations by the media owner for the determined order destination, registration and/or update of the evaluation for the individual factories, which is calculated within the print order server 41, and the like. The trained model 414D may be generated by, for example, a deep learning method in which past cases are given as the labeled training data, or a reinforcement learning method in which a high reward (or score) is given to a highly evaluated order. Furthermore, it may be generated by a method of deep reinforcement learning, which combines the deep learning and reinforcement learning.

In addition, the print order server 41 includes a display unit 415 used to display an operation screen of the program executed by the CPU 411, an operation input unit 416 used for inputs of an operator who operates the operation screen, and a communication I/F used to communicate with an Internet 5 (See FIG. 1). The display unit 415 and the operation input unit 416 here may be externally attached to the housing of the print order server 41. Furthermore, a printing equipment (not depicted) may be connected to the print order server 41. Each part depicted in FIG. 9 is connected to each other through a bus (not depicted) or a communication line (not depicted).

Figure 10:
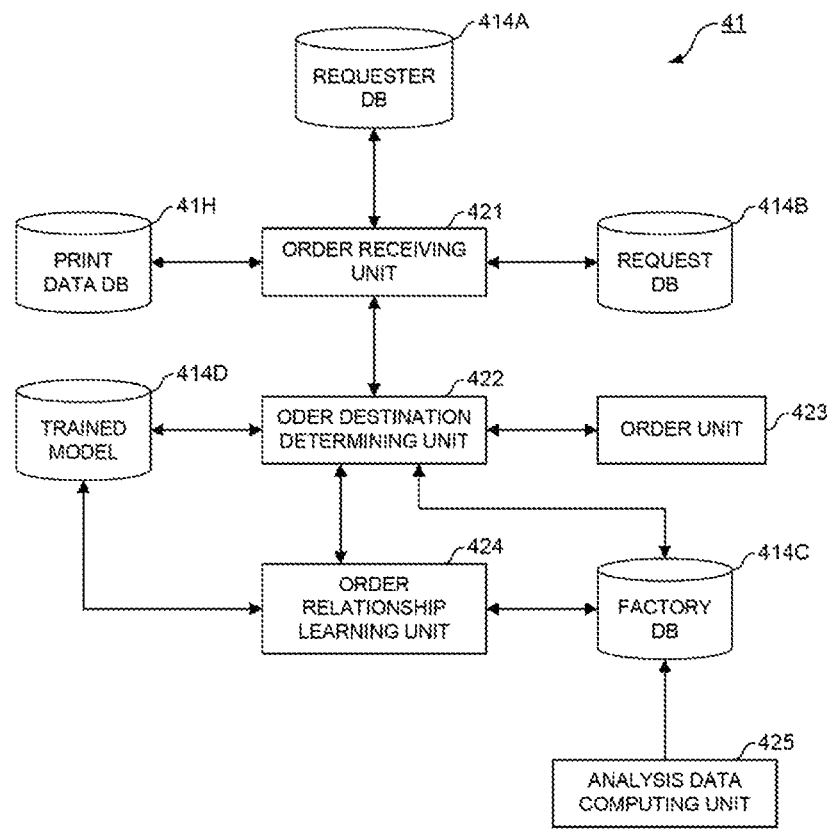
FIG. 10 is a diagram depicting a functional configuration example of the print order server used in the embodiment 1.

FIG. 10 is a diagram depicting a functional configuration example of the print order server 41 used in the first embodiment. The functional configuration depicted in FIG. 10 is realized through the execution of a program by the CPU 411 (see FIG. 9). The functional configuration here may be realized by a single program or in cooperation with plural programs. The print order server 41 in view of a functional aspect has an order receiving unit 421 that receives printing requests, an order destination determining unit 422 that automatically determines the optimum order destination for conditions of the received request, an order unit 423 that places an order of printing and the like with one or more printing company systems 45 (see FIG. 1), which are the determined order destination, an order relationship learning unit 424 that learns the past order relationship to update the trained model 414D, and an analysis data computing unit 425 that calculates analysis data to be accumulated in the factory DB 414C.

The order receiving unit 421 is an example of a receiving means to receive a printing request from the media owner through the advertising effectiveness measuring server 30 (see FIG. 1), and is a program that manages the received printing request by the order ID. The order receiving unit 421 registers information about the requester in the requester DB 414A, or reads out the registered information about the requester. In addition, the order receiving unit 421 manages conditions and the like of the received request in the request DB 414B. The conditions of the request include the place to which the printed matter is delivered, that is, the delivery destination. In addition to the delivery destination, a request for a place where a factory exists where the printing company system 45 is installed may be included. The request here may be specified by, for example, a country or region, an administrative unit within the country or region, a name representing a set of administrative units, or the like. The hierarchical structure of administrative units and the names of each hierarchical level differ depending on the country or region.

The order destination determining unit 422 is a program to determine a factory that satisfies the conditions of the request conditions as an order destination. There may be one factory for one request, or there may be multiple factories for one request. In the case of this embodiment, priority is given to placing an order with a factory located near the delivery destinations included in the conditions of the request. The factory DB 414C and the trained model 414D are used to determine the order destination. In the trained model 414D, a model for determining a more appropriate order destination is recorded. Furthermore, in the factory DB 414C, in addition to information to be synchronized with the factory side (for example, status, production capacity, schedule), the evaluation of the quality of the paper media printed at the factory, records of past orders, and the like are accumulated.

The order unit 423 is a program that transmits order information (for example, printing application, content of the processing, number of copies, delivery destination, price information, etc.) to the printing company system 45 installed in the factory determined as the order destination.

The order relationship learning unit 424 in this embodiment is a program that learns a relationship among the order destination determined for the conditions of the printing, which are stored in the factory DB 414C, and information about the evaluation of the factory as the order destination and the like to reflect the results of the learning on the trained model 414D by using the artificial intelligence function. As described above, not only deep learning using labeled training data but also reinforcement learning and/or deep reinforcement learning may be used to learn the order relationship. Since the information stored in the factory DB 414C is the data after being arranged into information in a format that does not depend on differences in models, or data obtained by processing such data, the learning accuracy is likely to be improved.

The analysis data computing unit 425 is a program that analyzes past and future operating status for each production equipment, prediction of the operation availability status of the production equipment in the future time, the future inventory amount and the like based on information such as the operating status of the production equipments, the production capacity, schedules and the like, which is automatically accumulated in the factory DB 414C. When the analysis process equivalent to the analysis data computing unit 425 is executed in the printing company system 45, the analysis data computing unit 425 does not have to be provided.

<Configuration of Print Company System>

Figure 11:
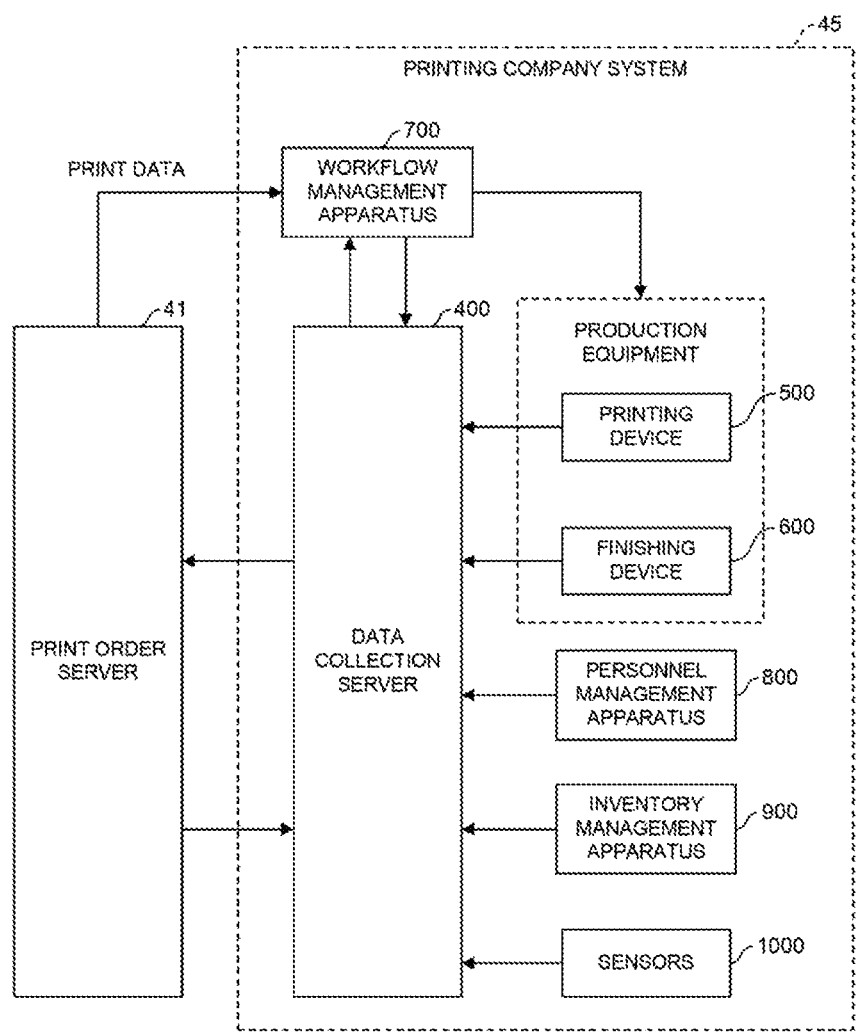
FIG. 11 is a diagram to explain the overall configuration of the printing company system used in the embodiment 1.

FIG. 11 is a diagram illustrating an overall configuration of the print company system 45 used in the first embodiment. In the printing company system 45, a data collection server 400 that collects information associated with the printing and registers it in the print order server 41, a printing device 500 to print characters, images and other information based on the print data on paper media, a finishing device 600 that processes the printed paper media, a workflow management apparatus 700 that manages the printing schedule, a personnel management apparatus 800 that manages the allocation of personnel in the factory, an inventory management apparatus 900 that manages the inventory of the consumable such as paper, and a sensor 1000 for detecting the quality of the paper media, the environment in the factory, the movement of people in the factory, and the like are arranged. The printing device 500 and the finishing device 600 here are both examples of the production equipments. In the example of FIG. 11, both the printing device 500 and the finishing device 600 are arranged in the factory where the printing company system 45 is installed, but only one of them may be arranged. In other words, the printing company system 45 may be a system corresponding to a factory dedicated to the printing or a system corresponding to a factory dedicated to the processing. In the case of this embodiment, the data collection server 400 is installed by the intermediary company that operates the print order server 41.

In the case of FIG. 11, only one printing device 500 is depicted, but this is due to restrictions on depicting, and the number of printing devices 500 to be arranged is arbitrary. Therefore, the number of printing devices 500 may be one or plural. The manufacturer of the printing device 500 may differ from factory to factory. Further, plural printing devices 500 from different manufacturers may coexist in the factory. The finishing device 600 is similar to the printing device 500. That is, the finishing device 600 does not have to be limited to one, and may be plural. Further, the manufacturer of the finishing device 600 may be different for each factory.

Further, plural finishing devices 600 from different manufacturers may coexist in the factory.

The workflow management apparatus 700 is an apparatus that collectively manages production in the factory. For example, the workflow management apparatus 700 performs order processing for print jobs, imposition for collecting print jobs having the same specifications, management of printing schedules and/or processing schedules, progress management of printing and/or processing, and the like. The workflow management apparatus 700 is connected to the printing device 500 and the finishing device 600 through a network in the factory to send and receive various data. For example, the received print data (so-called print ready data) is transmitted from the workflow management apparatus 700 to the printing device 500 according to the printing schedule. The workflow management apparatus 700 in this embodiment manages (i) output data from the sensor 1000 that is arranged on the route on which the paper or the like is conveyed in the printing process and detects printing defects and/or abnormalities, (ii) output data from the sensor 1000 that is arranged on the route on which the paper media after printing is conveyed in the processing process and detects processing defects and/or abnormalities, and (iii) output data from the sensor 1000 that manages the quality of the processed paper media such as stains and defects, and the like.

The sensor 1000 here may be arranged in the housing of the printing device 500 or the finishing device 600, or may be arranged separately from the printing device 500 or the finishing device 600. The format of the data output from the sensor 1000 differs depending on the type of the sensor 1000 and/or the manufacturer. In addition, the workflow management apparatus 700 in this embodiment also manages information on the delivery company 50 (see FIG. 1) used for delivery of the produced product (in case where the processing is performed at another factory, paper media before the processing). The information on the delivery company 50 includes the name of the business entity that provides the delivery service, the name of the service, the details of the delivery service, the shipping date, the shipping number, the billing amount for each ordering unit, the total billing amount for each ordering source, information to specify information regarding prohibition of the use outside the factory, and the like. The workflow management apparatus 700 realizes management of such information and provision of functions through a program running on a computer.

The personnel management apparatus 800 in this embodiment manages skills, attendance schedules, and the like for each worker engaged in work in the factory. In addition, the personnel management apparatus 800 in this embodiment also manages the output history of the behavior sensor attached to the worker. The behavior sensor here is an example of the sensor 1000. The behavior sensor may be carried by a worker, for example, or may be attached to clothes or the like. Moreover, the behavior sensor may be, for example, a camera. When the camera is used as a behavior sensor, the personnel management apparatus 800 may manage the movement and/or work of the worker in the captured image in association with the worker specified by the face recognition technique. Furthermore, the sensor 1000 may be attached to the equipment used by the worker for the work. In this case, the personnel management apparatus 800 may manage the movement of the equipment in the factory in association with the worker.

The inventory management apparatus 900 in this embodiment manages information regarding the inventory of materials such as paper, ink, toner, which are consumed by the printing device 500, and film consumed by the finishing device 600. Information on the inventory may include a code for identifying the inventory (that is, inventory ID), a material name, a material category, the number of inventories, a code for identifying a business entity that supplies the material (that is, a supplier ID), a business entity name, a type of the material supplied by the business entity. Information on the inventory is updated, for example, by reading the code for identifying the inventory when the material is consumed. In addition, it is updated by reading the information recorded in the IC tag attached to the inventory or its packaging.

The data collection server 400 communicates with the printing device 500, the finishing device 600, the workflow management apparatus 700, the personnel management apparatus 800, the inventory management apparatus 900, and the sensor 1000, and collects various information related to the printing from each apparatus. The communication here may be wired or wireless. From the printing device 500, for example, the data collection server 400 collects information such as a code for identifying the device (that is, a device ID), a device name, device specification information, a device status, status details, a printing kind (type), a printing speed, speed units, maximum and minimum sizes of the paper that can be handled, color space and color reference information, and daily production capacity. The status here is specified by, for example, idle state, failure, in use, and in maintenance. The format of the description of this information differs depending on the manufacturers of the printing devices 500, and may differ depending on the models of even the same manufacturer.

Furthermore, for example, from the finishing device 600, the data collection server 400 collects information such as a code for identifying the device (that is, a device ID), a device name, device specification information, a device status, status details, a processing kind or type, speed units, and daily production capacity. The status here is the same as in the case of the printing device 500. The types of processing include, for example, folding, corner rounding, drilling, sewing, creasing, coating, foil stamping, panel mounting, die cutting and the like. The format of the description of this information differs depending on the manufacturers of the finishing devices 600, and may differ depending on the models of even the same manufacturer.

Moreover, for example, from the workflow management apparatus 700, the data collection server 400 collects information such as order information, a printing schedule, a processing schedule, progress information of each schedule, an operating status of each production apparatus, an operating rate of each production apparatus, and a maintenance record of each production apparatus. In addition, the data collection server 400 obtains information such as skills and attendance schedules for each worker engaged in work in the factory from the personnel management apparatus 800. Further, the data collection server 400 collects information on the inventory of consumables consumed in the production apparatus from the inventory management apparatus 900.

The data collection server 400 obtains information at the same time as information is generated in each device or sensor 1000. That is, the data collection server 400 in this embodiment automatically collects information that is generated during production in the factory and changes with time. Further, the data collection server 400 in this embodiment has a function to arrange (cleanse) the collected information into information in a format that does not depend on differences in models, and transmits the information after cleansing (after arranging) to the print order server 41. Differences in models here include differences in manufacturers. In addition, the differences in models include differences in products with different data formats of the same manufacturer. In the case of this embodiment, the data collection server 400 also transmits the information obtained by analyzing the information after cleansing (after arranging) to the print order server 41 through the secure line. The information obtained by analyzing the information after cleansing (after arranging) is also an example of the information in the format that does not depend on the differences in models. The information obtained by analyzing the information after cleansing (after arranging) includes, for example, the current operation availability status of the production equipment, the forecast of the operation availability status of the production equipment in the future time, the forecast of the inventory amount, and the like. The maintenance schedules and holidays are also reflected in the calculation of the operation availability status. In the case of this embodiment, the print data is directly transmitted from the print order server 41 to the workflow management apparatus 700, but it can also be given to the workflow management apparatus 700 via the data collection server 400.

Figure 12:
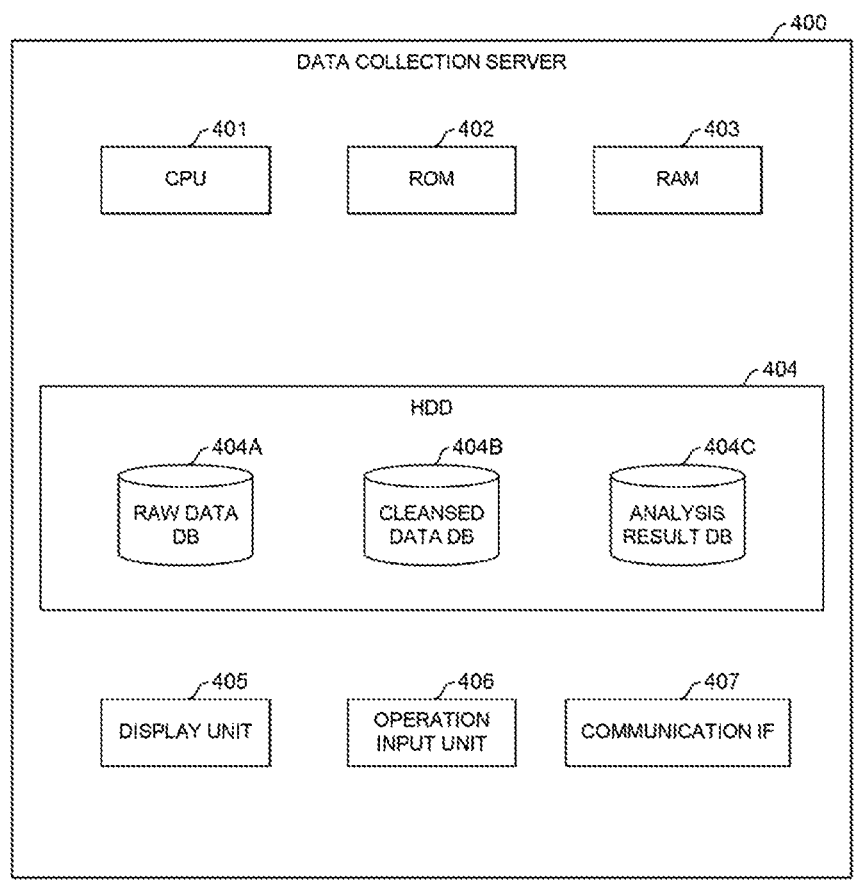
FIG. 12 is a diagram depicting a hardware configuration example of a data collection server used in the embodiment 1.

Next, the configuration of the data collection server 400 will be described. FIG. 12 is a diagram illustrating a hardware configuration example of the data collection server 400 used in the first embodiment. As depicted in FIG. 12, the data collection server 400 includes a CPU 401 that controls the entire device through execution of programs (including basic software), a ROM 402 that stores a BIOS and the like, and a RAM 403 that is used as a program execution area. The CPU 401, ROM 402, and RAM 403 constitute a so-called computer and execute various types of information processing. The ROM 402 is composed of, for example, a non-volatile semiconductor memory. The CPU 401 is an example of a processor.

The hard disk device 404 stores basic software, order information received from the print order server 41 (See FIG. 11), a raw data DB 404A that stores raw data collected from the inside of the factory, a cleansed data DB 404B that records raw data after arranging (cleansing) the raw data into the format that does not depend on the differences in models, an analysis result DB 404C that stores the result of analyzing the cleansed raw data, and the like. In this embodiment, the data collected by the data collection server 400 from the inside of the factory is referred to as the raw data.

From the printing device 500 (see FIG. 11), for example, information in the data format that depends on the manufacturer and/or models such as a device ID, a device name, device specification information, a device status, status details, a printing kind (type), a print speed, speed units, the maximum and minimum sizes of paper that can be handled, color space and color reference information, and daily production capacity is automatically collected through the network in the factory. From the finishing device 600 (see FIG. 11), for example, information in the data format that depends on the manufacturer and/or models such as a device ID, a device name, device specification information, a device status, status details, a processing kind (type), a processing speed, speed units, daily production capacity is automatically collected through the network in the factory.

From the workflow management apparatus 700 (see FIG. 11), information in the data format that depends on the program that manages data such as order information, a print schedule, schedule progress information, operation status of each production device, an operation rate of each production device, and a maintenance record for each production device is automatically collected through the network in the factory. From the personnel management apparatus 800 (see FIG. 11), information in the data format that depends on the program that manages data such as skills and attendance schedules for each worker engaged in work in the factory is automatically collected through the network in the factory. From the inventory management apparatus 900 (see FIG. 11), information on the inventory of consumables consumed by the production devices in the data format that depends on the program that manages data is automatically collected through the network in the factory. Furthermore, from the sensor 1000 (see FIG. 11) mounted on an inspection device (not depicted), the output of each sensor in the data format that depends on the manufacturers and/or models is automatically collected through the IoT (=Internet of Things) network or the like.

In the case of this embodiment, the analysis result DB 404C stores, as the analysis result, the current operation availability status of the production equipment, the prediction of the operation availability status of the production equipment in the future time, the forecast of the inventory amount, the operation schedule of the production device, and the like. The contents of the analysis results and/or the data format are recorded in a unified content and format regardless of the factory. In addition, artificial intelligence may be used for cleansing (arranging) the raw data and analyzing the raw data after cleansing (after arranging). However, a program that analyzes information according to predetermined rules may be used. Reinforcement learning and/or deep reinforcement learning in addition to the deep learning using the labeled training data may be used for learning of the trained model used for the analysis here.

In addition, the data collection server 400 includes a display unit 405 used to display an operation screen of a program executed by the CPU 401, an operation input unit 406 used for the input from an operator who operates the operation screen, and a communication I/F 407 used for communication with the Internet 5 (see FIG. 1) and/or the network in the factory (not depicted). For example, a LAN is used for communication with the network in the factory. The display unit 405 and the operation input unit 406 may be externally attached to the housing of the data collection server 400. Each part depicted in FIG. 12 is connected to each other through a bus (not depicted) or a communication line (not depicted).

Figure 13:
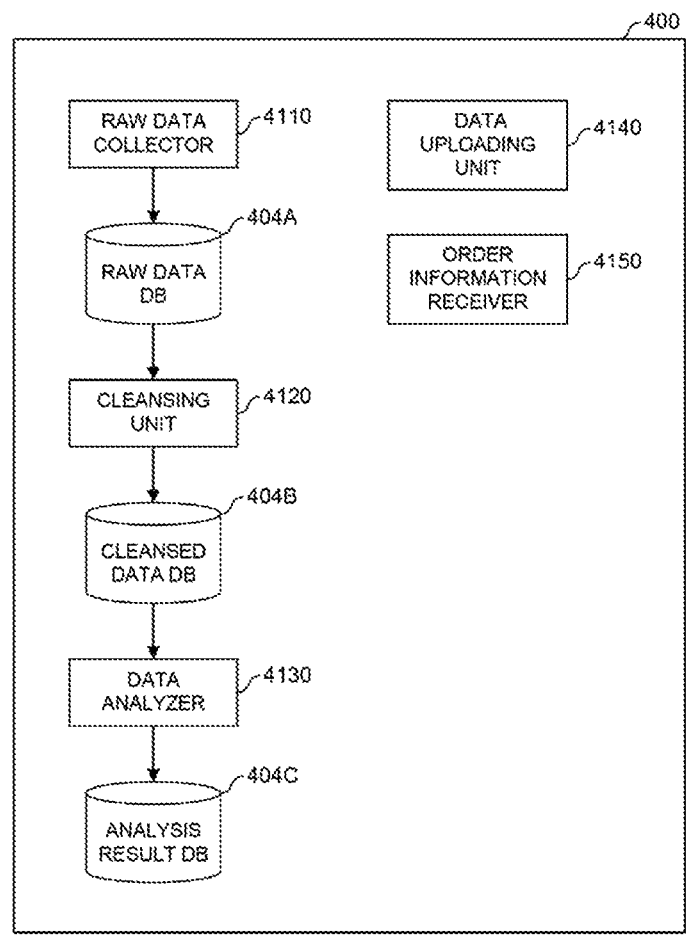
FIG. 13 is a diagram depicting a functional configuration example of the data collection server used in the embodiment 1.

FIG. 13 is a diagram illustrating a functional configuration example of the data collection server 400 used in the first embodiment. The functional configuration depicted in FIG. 13 is realized through the execution of programs by the CPU 401 (see FIG. 12). The functional configuration here may be realized by a single program or in cooperation with plural programs. The data collection server 400 in view of the functional aspect includes functions as a raw data collector 4110 that collects, as raw data, information used to determine the order destination from each device and/or sensor by communicating with the printing device 500 (see FIG. 11), the finishing device 600 (see FIG. 11), the workflow management apparatus 700 (see FIG. 11), the personnel management apparatus 800 (see FIG. 11), the inventory management apparatus 900 (see FIG. 11), and the sensor 1000 (see FIG. 11); a cleansing unit 4120 that cleanses (arranges) the collected raw data in a format that does not depend on the models; a data analyzer 4130 that analyzes the cleansed raw data to generate useful information for determination of the order destination and/or improvement of problems specific to each factory; a data uploading unit 4140 that uploads the cleansed raw data and analysis results to the print order server 41 (see FIG. 11); and an order information receiver 4150 that receives the order information from the print order server 41.

The raw data collector 4110 is a program that collects information representing the status, production capacity, schedule and the like of the production equipment in real time by communicating with the production equipment and the like in the factory. Data collection may be realized as a response to a transmission instruction to the production equipment or the like by the raw data collector 4110, or may be realized by receiving data unilaterally output from the production equipment and the like. The data to be collected basically changes dynamically over time. However, the cycle of change differs depending on the type of data. In addition, although all the information generated or managed by the production equipment and the like may be collected, only the information in which the change is detected may be selectively collected. The function of detecting the change may be provided in the raw data collector 4110, or may be provided in the production equipment and the like.

The cleansing unit 4120 is a program that cleanses (arranges) the differences in the data format and the like that depend on the manufacturer, model, and the like into a predetermined data format. In the cleansing, not only the data format conversion is performed, but also notational fluctuations and duplication of information are removed. The cleansing unit 4120 is an example of an arranging means. The cleansing unit 4120 may execute anonymization of the personal information of the worker, removal of information whose provision of the information to the print order server 41 (see FIG. 11) is prohibited, and the like. Data whose upload to the print order server 41 is prohibited, but whose use in the data analysis by the data collection server 400 is allowed may be cleansed (arranged) after attaching a flag to prohibit the transmission to the print order server 41 by the cleansing unit 4120.

The data analyzer 4130 is a program that analyzes the raw data after cleansing and outputs the operation rate of each production equipment or the entire factory, the failure prediction of the production equipment, the maintenance prediction, the error pattern prediction, the state of the production equipment, the production capability of the production equipment, a schedule plan to improve the production capability, the schedule plan to improve the profit margin, and the like. A trained model or a program that combines tables and judgment processes may be used for the analysis. The data analyzer 4130 also has a function to display the analysis result on the operation screen of the display unit 405 (see FIG. 12).

The data uploading unit 4140 is a program that automatically uploads the cleansed raw data and its analysis result to the print order server 41. Of these, the cleansed raw data is automatically uploaded without delay after data processing. By this upload, the data in the factory DB 414C (see FIG. 10) used by the print order server 41 to determine the order destination and the data in the printing company system 45 (see FIG. 1) which is the upload source are synchronized. As described above, the data whose upload to the print order server 41 is prohibited is excluded from data to be uploaded. In the case of this embodiment, the data uploading unit 4140 is provided with a function to perform filtering so that information other than predetermined information is not uploaded, for example. The data uploading unit 4140 in this embodiment executes communication with the print order server 41 in a state where the security of the communication contents is kept. The order information receiver 4150 is a program that receives a notification of the order information from the print order server 41. The ordering information receiver 4150 cooperates with the workflow management apparatus 700 (see FIG. 11) and shares a part of the order information with the workflow management apparatus 700.

<Processing Operation by the Paper Advertisement System>

The processing operation by the paper advertisement system 1 (see FIG. 1) will be described below by dividing it into three stages. The first stage corresponds to a processing operation until the advertising effectiveness measuring server 30 (see FIG. 1) receives printing and delivery of the paper media from the media owner and generates print data for each delivery destination. The second stage corresponds to a processing operation in which the print order server 41 (see FIG. 1) determines a factory with which an order of the printing and the like of the paper media, which is received from the media owner, is placed. The third stage corresponds to a processing operation until the advertising effectiveness measuring server 30 analyzes the measurement results obtained from the media owner system 10 (see FIG. 1) and the advertiser system 20 (see FIG. 1) and presents the effects of the media-sharing type advertisement.

<Processing Operation in the First Stage>

Figure 14:
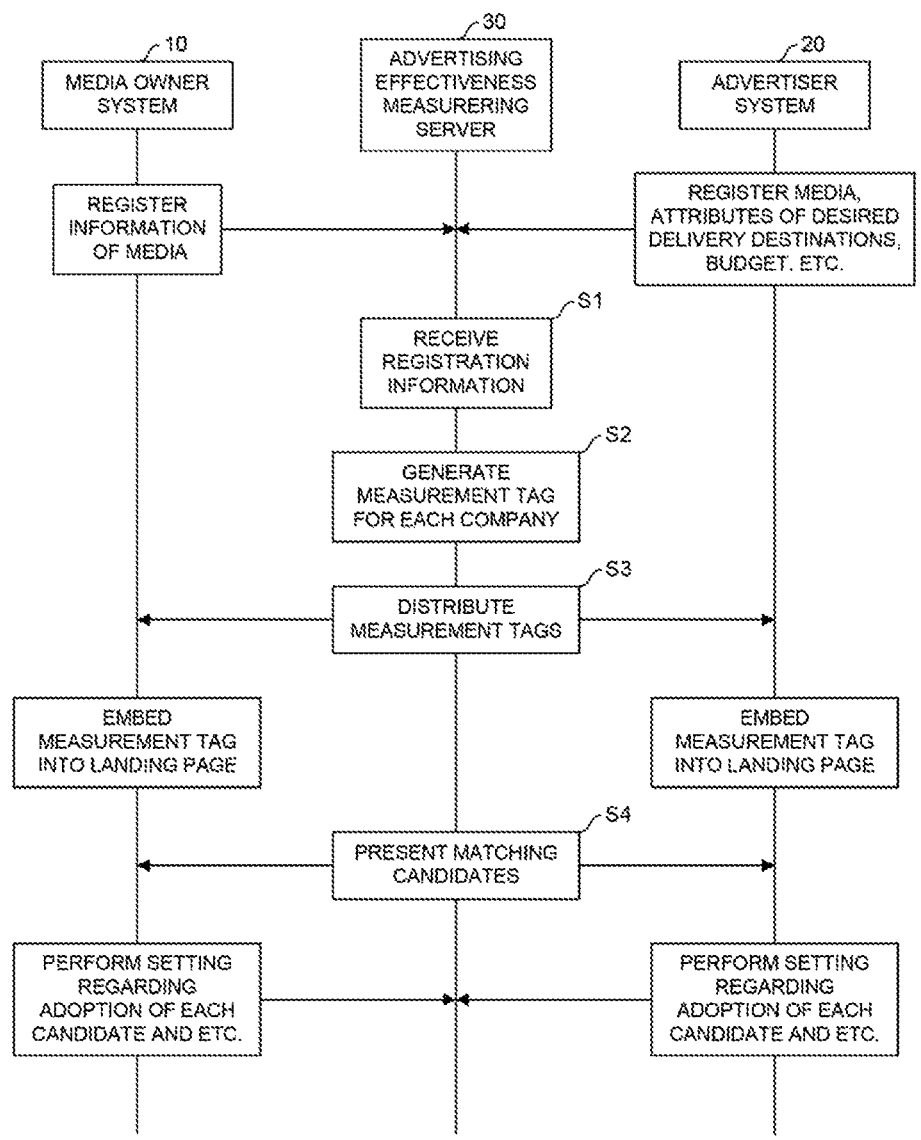
FIG. 14 is a diagram to explain a processing operation corresponding to the preliminary setup in the 1st stage.

Here, the processing operation in the first stage will be described with reference to FIGS. 14 to 18. FIG. 14 is a diagram illustrating a processing operation corresponding to the preliminary setup in the first stage. Furthermore, in FIG. 14, for convenience of explanation, the media owner system 10 and the advertiser system 20 are drawn one by one, but each may be plural.

First, the advertising effectiveness measuring server 30 receives registration information from each of the media owner system 10 and the advertiser system 20 who wish to participate in the paper advertisement system 1 (see FIG. 1) (step S1). For example, from the media owner system 10, the media owner, the type of paper media, the size of the media, the number of copies to be printed, the conditions regarding the cause of placing an order for printing, the attributes regarding the delivery destination, and the like are given as registration information. These registration information are stored in the media owner DB 314A (see FIG. 5) and/or the media DB 314C (see FIG. 5). On the other hand, from the advertiser system 20, the advertiser, the media on which the advertisement is desired to be placed, the attributes of the desired delivery destinations, the budget, and the like are given as registration information. These registration information are stored in the advertiser DB 314B (see FIG. 5) and/or the advertisement DB 314D (see FIG. 5).

Next, the advertising effectiveness measuring server 30 generates a measurement tag for each business entity (step S2). Specifically, a measurement tag unique to the media owner whose registration information was received and a measurement tag unique to the advertiser whose registration information was received are generated. The generated measurement tags are stored in the measurement tag DB 314E (see FIG. 5). When the measurement tags are generated, the advertising effectiveness measuring server 30 distributes the generated measurement tag to the system of the corresponding business entity (step S3). In the case of FIG. 14, a measurement tag including the key "media=XXX" is distributed to the media owner system 10. Further, a measurement tag including the key "ad=YYY" is distributed to the advertiser system 20. The distribution here is performed, for example, by a media owner and an advertiser obtaining a measurement tag for himself or herself from a site prepared by the advertising effectiveness measuring server 30. The media owner and advertiser who have obtained the measurement tag embeds the obtained measurement tag in the landing page where he or she wants to measure the inflow from the QR code. FIGS. 15A and 15B are diagrams to explain an example of embedding the measurement tag. FIG. 15A is an example of a media owner's landing page, and FIG. 15B is an example of an advertiser's landing page. In the case of FIG. 15A, the URL of the landing page of the media owner is "https://XXX?id=abc", and the measurement tag (including the key "media=XXX") is embedded in the page. On the other hand, in the case of FIG. 15B, the URL of the advertiser's landing page is "https://XYZ?CID=1" and the measurement tag (including the key "ad=YYY") is embedded in the page.

Returning to the explanation of FIG. 14, in the case of FIG. 14, at this stage, the advertising effectiveness measuring server 30 presents business entities who may be partners of the media-sharing type advertisement as matching candidates (step S4). The registration information in the media DB 314C (see FIG. 5) and/or the advertisement DB 314D (see FIG. 5) is referred to in determining the matching candidates. The determination of matching candidates is performed mechanically. The presentation of matching candidates is only performed if the media owner and/or advertiser so desires. The matching candidates may be presented on a regular basis or every time a new media owner and/or advertiser are added. The business entity who receives the presentation of the matching candidates transmits the setting such as approval or disapproval for each candidate to the advertising effectiveness measuring server 30 via the Internet 5 (see FIG. 1). The approval or disapproval for each candidate is whether or not to allow it as the partner of the media-sharing type advertisement. This completes the preliminary setups.

Figure 16:
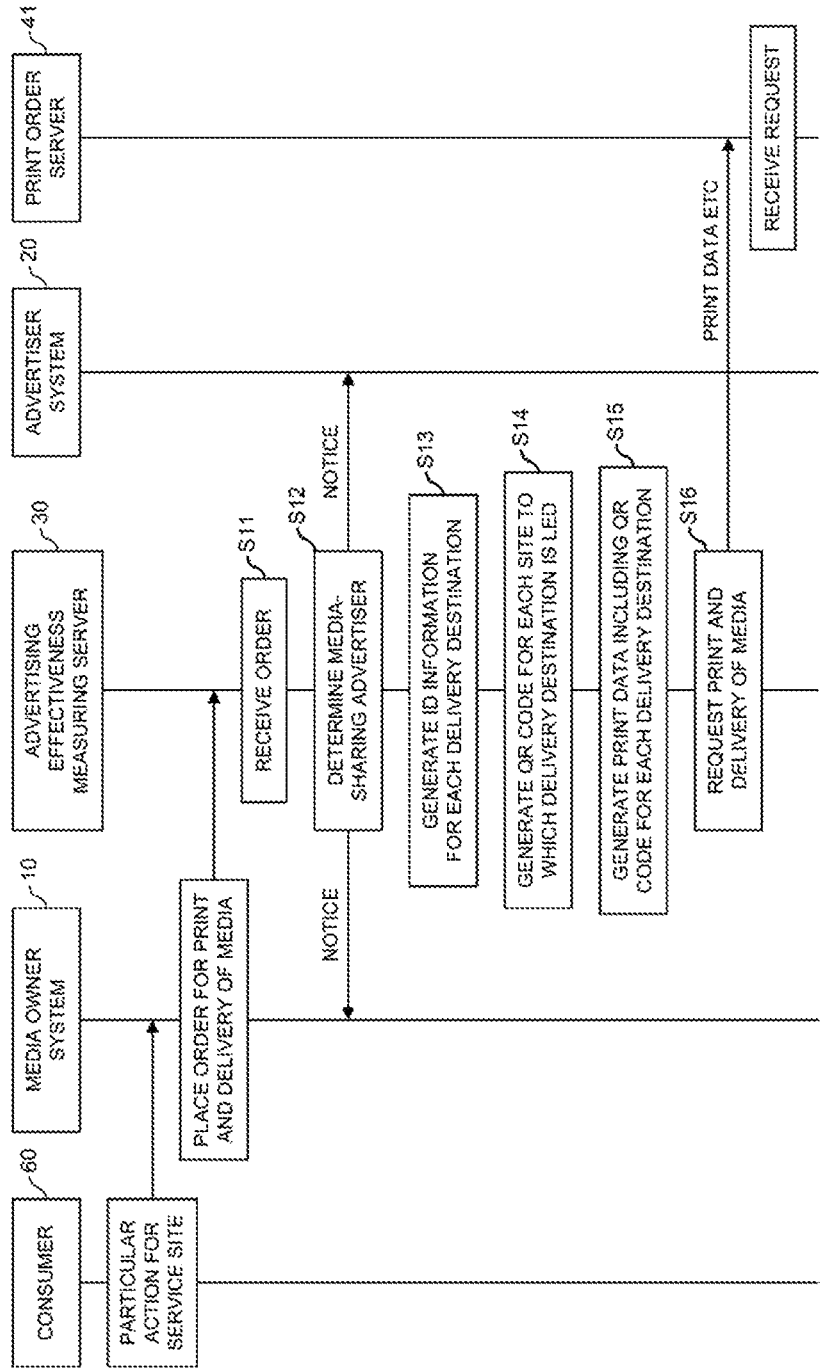
FIG. 16 is a diagram to explain a processing operation after ordering the print and delivery of a media in the first stage.

FIG. 16 is a diagram illustrating a processing operation on and after placing an order for printing and delivery of the paper media in the first stage. Also in the case of FIG. 16, for convenience of explanation, the media owner system 10 and the advertiser system 20 are drawn one by one. In the case of FIG. 16, the requester of the printing and delivery of the paper media is a single media owner, however, there may be plural advertisers who are the partner of the media-sharing type advertisement. The order for the printing and delivery of the paper media from the media owner system 10 to the advertising effectiveness measuring server 30 is generated when the consumer 60 executes a specific action on the service site. Actions here include, for example, reservations and/or orders for purchases, the occurrence of products that have been added to the shopping cart but have not been purchased (so-called shopping cart abandonment), request for materials, purchase information collected from POS terminals, and scanning action of RFID. The print request server 10A (see FIG. 2) in the media owner system 10 that has detected these actions places an order with the advertising effectiveness measuring server 30 to print and deliver the paper media to the consumer 60 who executes the action.

The advertising effectiveness measuring server 30 receives an order from the media owner system 10 (step S11). This process is executed by the print order receiving unit 324 (see FIG. 7B). The order here includes, for example, the names or titles of the delivery destinations, the addresses or whereabouts of the delivery destinations, the manuscript data for each delivery destination, the URL of the landing page to which the access from the delivery destination is led, and the like. The manuscript data includes images of products and/or services recommended for the consumer 60 (see FIG. 1), which is the delivery destination. If the products or the like that the consumer 60 is interested in is different, the manuscript data may be prepared for each delivery destination. Next, the advertising effectiveness measuring server 30 determines an advertiser who shares the media for each delivery destination (step S12). The advertiser who is a partner of the media-sharing is determined on the conditions that both the media owner and the advertiser give permission as matching candidates, that the attributes of the delivery destination, which are desired by the advertiser, are met, and the like. In the case of this embodiment, the advertising effectiveness measuring server 30 notifies the counterpart of the information regarding the determined counterpart of the media-sharing type advertisement. This notification may be executed each time the counterpart of the media-sharing is determined, or may be executed after the fact according to a predetermined time or cycle.

Subsequently, the advertising effectiveness measuring server 30 generates identification information for each delivery destination (step S13). The identification information generator 326 (see FIG. 7B) is used to generate the identification information. If the identification information for the delivery destination exists, it is read from the delivery destination DB 314I (see FIG. 6B) and used. The generation of the identification information may be executed in parallel with the above-mentioned step S12. Next, the advertising effectiveness measuring server 30 generates a QR code for each site to which access from the delivery destination will be led (step S14). The business entities that establish the site to which the access from the delivery destination here will be led are the media owner and the advertiser determined for each delivery destination. However, the media owner here is not limited to the media owner, and may include a business entity that provides products and/or services advertised by the media owner. The generated QR code includes identification information unique to each delivery destination. Therefore, even if the site to which access will be led is the same, when the delivery destination is different, a QR code with different contents is generated. In other words, at the step S14, a QR code personalized according to the delivery destination is generated. The QR code generated for the combination of the delivery destination and the media owner includes the URL of the landing page of the media owner, the media ID, the identification information for each delivery destination, and other information. In addition, the QR code generated for the combination of the delivery destination and the advertiser includes the URL of the landing page of the advertiser, the media ID, the identification information for each delivery destination, and other information. The media ID is an ID unique to the paper media, and it is possible to identify the paper media that is the starting point of access to the landing page.

Figure 17A:
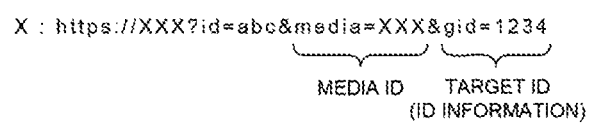
FIG. 17A is a diagram depicting an example of information included in a QR code for the media owner X, in case of a consumer P as a delivery destination.
Figure 17B:
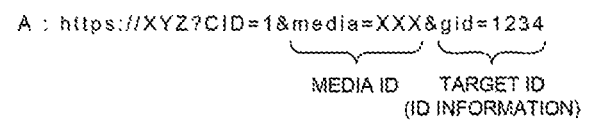
FIG. 17B is a diagram depicting an example of information included in a QR code for the advertiser A, in case of the consumer P as a delivery destination.

In the case of this embodiment, both the QR code generated for the media owner and the QR code generated for the advertiser include identification information unique to the delivery destination. By including this identification information, it becomes possible to analyze the effectiveness of the media-sharing type advertisement by the advertising effectiveness measuring server 30. FIGS. 17A and 17B are diagrams to explain an example of information included in the QR code generated for each business entity. FIG. 17A depicts an example of the information included in the QR code for the media owner X whose delivery destination is the consumer P, and FIG. 17B depicts the information included in the QR code for the advertiser A whose delivery destination is the consumer P. In the case of FIG. 17A, the URL of the landing page of the media owner X is "https://

XXX?id=abc", the media ID is "media=XXX", and the target ID as the identification information is "gid=1234". In the case of FIG. 17B, the URL of the landing page of advertiser A is "https://XYZ?CID=1", the media ID is "media=XXX", and the target ID as the identification information is "gid=1234". Although the media ID and/or the target ID are used as they are in the examples of FIGS. 17A and 17B, this information may be encrypted.

Figure 18:
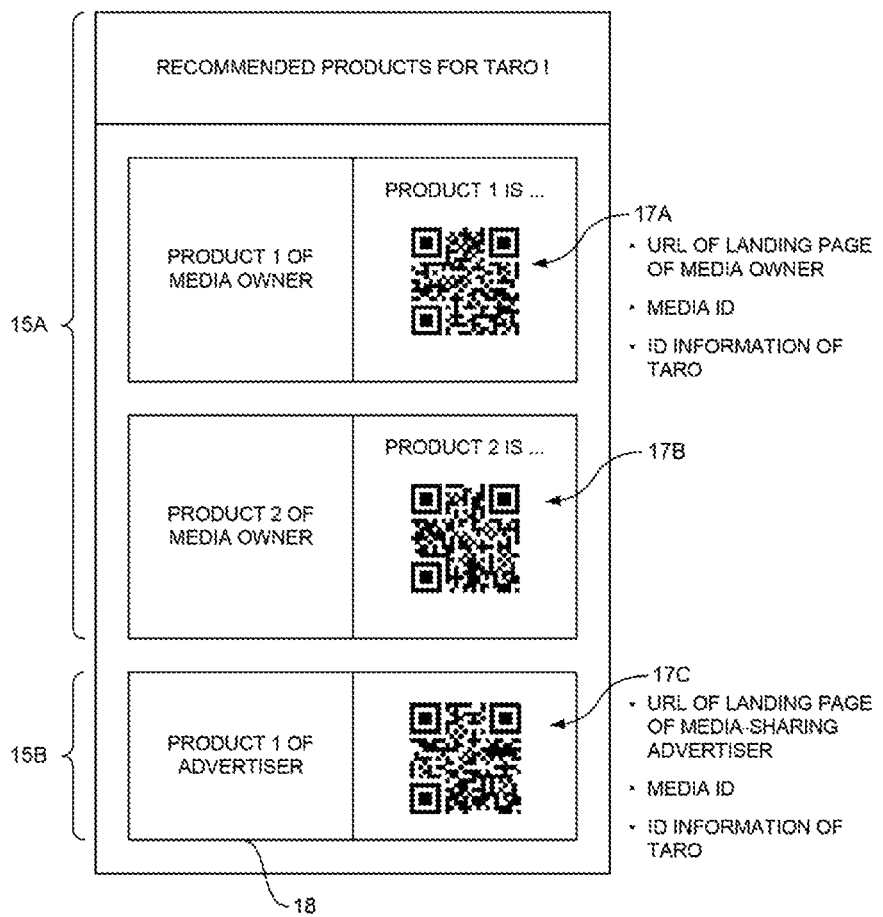
FIG. 18 is a diagram to explain a schematic example of print data generated for each delivery destination.

Returning to the explanation of FIG. 16, when the QR code is generated, the advertising effectiveness measuring server 30 generates print data including the QR code for each site to which the delivery destination will be led, for each delivery destination (step S15). FIG. 18 is a diagram illustrating a schematic example of the print data generated for each delivery destination. FIG. 18 is depicted with reference numerals corresponding to the portions corresponding to those in FIG. 3. The schematic print data depicted in FIG. 18 has a configuration in which the QR codes 17A, 17B, and 17C generated at the step S14 (see FIG. 16) and the advertiser's advertisement article 18 are added to the schematic manuscript data depicted in FIG. 3. The image data corresponding to the QR codes 17A and 17B here is an example of the first code, and the image data corresponding to the QR code 17C is an example of the second code. The QR codes 17A and 17B are examples of the first image, and the QR code 17C is an example of the second image.

For example, the QR code 17A includes the URL of the landing page, to which access to the product of company A, which is advertised by the media owner, is led. For example, the QR code 17B includes the URL of the landing page to which access to the product of company B, which is advertised by the media owner, is led. In the case of this embodiment, all of these landing pages are managed by the media owner's web server 13 (see FIG. 2). For example, the QR code 17C includes the URL of the landing page that is led from the product advertised by the advertiser who satisfies the conditions of the media-sharing type advertisement with the media owner. In the case of this embodiment, the landing page is managed by the advertiser's web server 23 (see FIG. 4).

Returning to the explanation of FIG. 16, when the print data is generated, the advertising effectiveness measuring server 30 requests the print order server 41 to print and deliver the paper media with designation of the delivery destinations (step S16). The order here includes order information from the media owner, which were received at the step S11. When the print order server 41 receives the request, the print order server 41 shifts to a process of determining an appropriate printing company system 45 (see FIG. 1) according to the delivery destinations and/or the request of the media owner who is the requester. That is, the processing operation shifts to the second stage. The processing operation depicted in FIG. 16 and described above are all automatically executed by the advertising effectiveness measuring server 30. That is, the time from the order by the media owner system 10 that detects a specific action by the consumer 60 to the printing request is significantly shortened.

<Processing Operation in the Second Stage>

Figure 19:
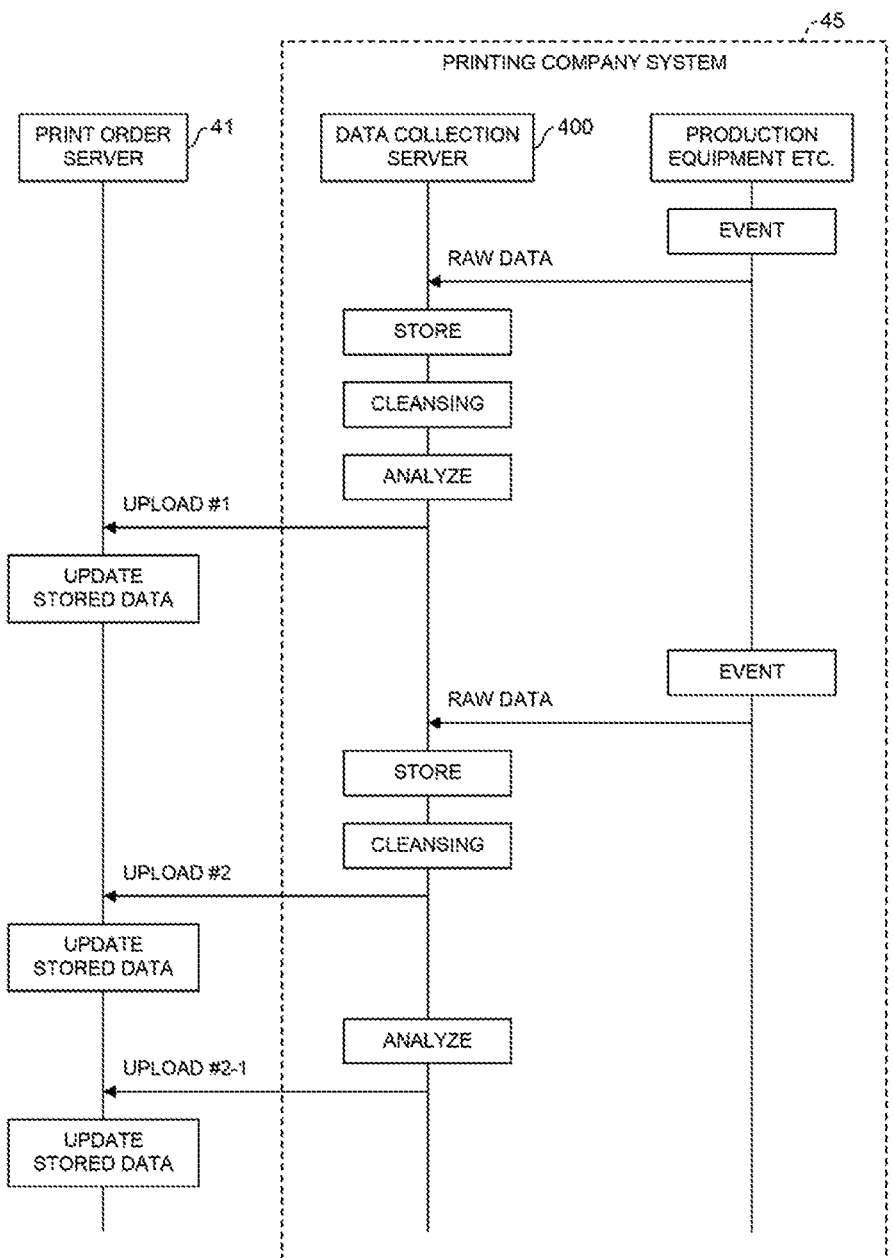
FIG. 19 is a diagram to explain a synchronous processing executed between a print order server and a printing company system.

Here, the processing operation in the second stage will be described with reference to FIGS. 19 and 20. FIG. 19 is a diagram illustrating a synchronization process executed between the print order server 41 and the printing company system 45. This process is always executed. The production equipment or the like depicted in FIG. 19 is a general term for the printing device 500 (see FIG. 11), the finishing device 600 (see FIG. 11), the workflow management apparatus 700 (see FIG. 11), the personnel management apparatus 800 (see FIG. 11), the inventory management apparatus 900 (see FIG. 11), and the sensor 1000 (see FIG. 11).

When an event to detect the generation or change of data occurs in the production equipment or the like, the raw data regarding the event is automatically transmitted from the production equipment or the like to the data collection server 400. After accumulating the received raw data, the data collection server 400 cleanses (arranges) the data, further analyzes the data, and uploads the data to the print order server 41. The print order server 41 updates the accumulated data with the newly received data. In upload #1 in the figure, the upload is executed after the analysis process is executed, but the raw data after cleansing may be uploaded before the analysis process is executed. Upload #2 uploads the data after cleansing (arranging) before analysis. The upload of the analysis result is separately executed as upload #2-1. Furthermore, in FIG. 19, although the upload is executed for each event, the raw data corresponding to plural events may be uploaded together. However, from the viewpoint of synchronizing the data accumulated in the print order server 41 with the data of the printing company system 45, it is preferable that the time from the occurrence of the event to the upload is short.

Figure 20:
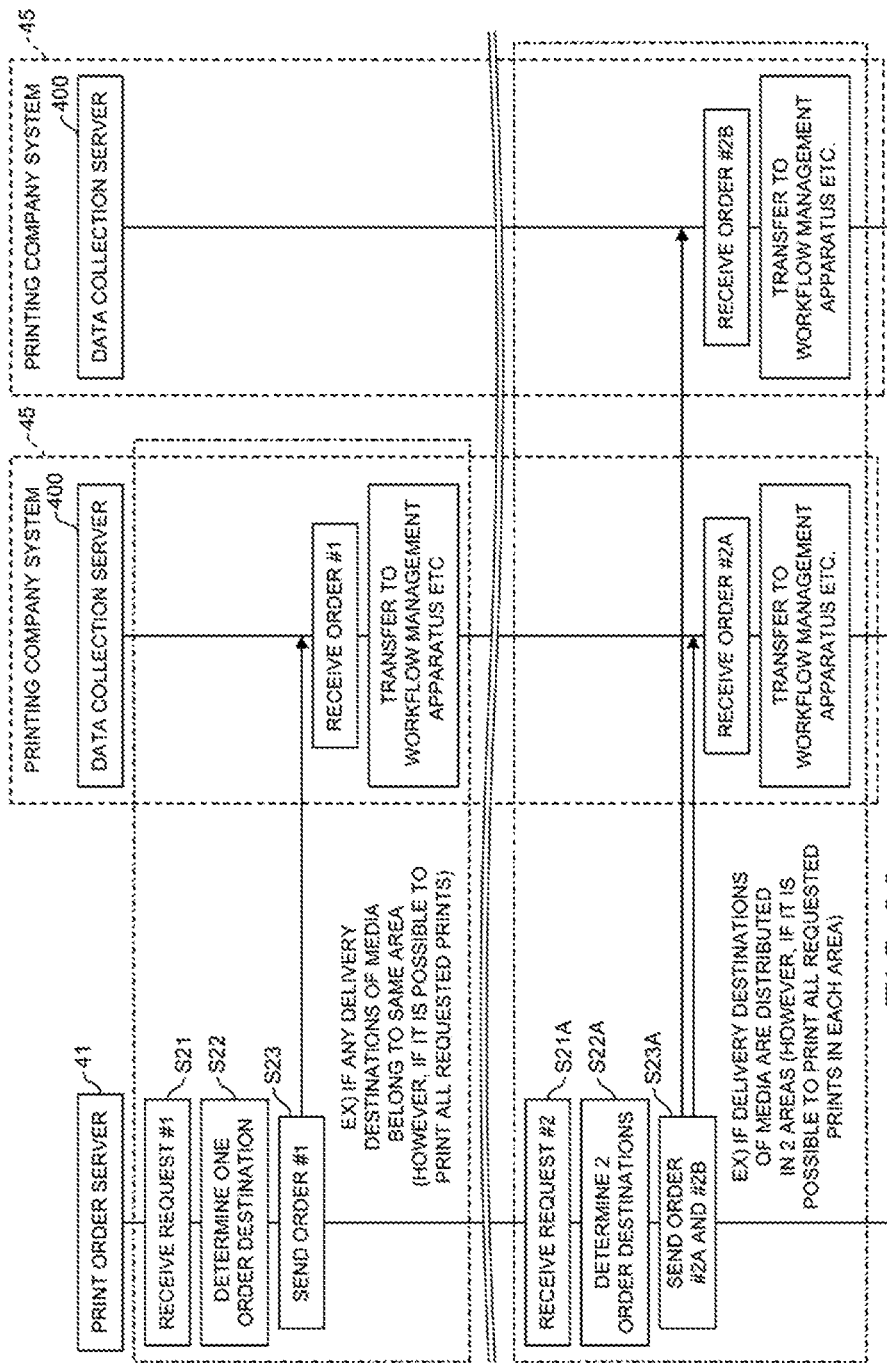
FIG. 20 is a diagram to explain an order processing of the print request by the print order server.

FIG. 20 is a diagram illustrating an order processing of a print request by the print order server 41. The processing operation of the print order server 41, which is depicted in FIG. 20, is started by receiving the print request #1 from the advertising effectiveness measuring server 30 (see FIG. 1) (step S21), or receiving the print request #2. (Step S21A). Request # corresponds to, for example, a case where all the delivery destinations of the paper media, which are specified by the media owner who is the requester of the printing, belong to the same area. Therefore, the print order server 41 determines one order destination that is located in or near the area to which the delivery destinations belong and that satisfies the request of the media owner (step S22). It should be noted that one order destination can be determined when all the requested number of copies can be printed in one factory. For example, that is a case that, when the number of copies specified in request #1 is 100, it is possible to print 100 copies at the determined order destination. Therefore, when the number of copies that can be printed by the determined order destination is 80, the printing of the remaining 20 copies is allocated to another order destination. In this case, plural printing company systems 45 are determined as the order destination, as in the case of request #2 described later. An additional allocation destination is also determined automatically. When the order destination is determined, the print order server 41 transmits the order #1 to the printing company system 45 corresponding to the factory that is the order destination (step S23). In the case of FIG. 20, the order #1 is received by the data collection server 400 of the printing company system 45 and transferred to the workflow management apparatus 700 and the like.

On the other hand, request #2 corresponds to, for example, a case where the delivery destinations of the paper media, which were specified by the media owner who is the requester of the printing are dispersed in two regions. Therefore, the print order server 41 determines one order destination that satisfies the request of the media owner for each of the two regions (step S22A). Of course, it should be noted that one order destination can be determined when all the requested number of copies can be printed in one factory. If it is not possible for one determined order destination to print all of the requested number of copies, the remaining number of copies is allocated to another factory. When the order destination is determined, the print order server 41 transmits orders #2A and #2B to the printing company systems 45 corresponding to the factories that are the order destinations (step S23A). The printing company system 45 that received the order #2A and the printing company system 45 that received the order #2B transfer the received orders #2A and #2B respectively through the data collection server 400 to the corresponding workflow management apparatus 700 and like.

In the case of this embodiment, even if an event that affects the delivery date and/or quality occurs in the factory of the order destination after the printing is ordered, the order destination can be switched in real time. For example, it is conceivable that an event such as a failure may occur in the printing device 500 (see FIG. 11) or the finishing device 600 (see FIG. 11) in the factory that received the order #1. The failure is an example of an event that affects the delivery time and/or quality. Note that the failure may occur before the start of the printing corresponding to order #1, may occur in the middle of the printing, may occur after the printing is completed but before the processing is started, or may occur in the middle of the processing. Furthermore, the event that affects the delivery date and/or the quality is not limited to the failure of the printing device 500 or the like in which the printing of the order #1 is scheduled, as long as any event that affects the printing schedule of the order #1. In addition, if one of the reasons that the factory is determined as the order destination is that it is possible to perform the printing or the like during the hours when a specific worker with high skill is working, the inability of the pertinent worker to engage in work during the execution of the printing or the like of the order #1 is treated in the same way as a failure.

In any case, the occurrence of an event that affects the delivery date and/or quality appears as a change in the numerical values in the raw data automatically collected by the data collection server 400 from the inside of the factory. Depending on the type and/or content of the failure or the like, the sensor 1000 (see FIG. 11) directly detects the failure. The data collection server 400 in this embodiment immediately cleanses (arranges) the collected raw data, and automatically uploads the raw data after cleansing (after arranging) or the analysis result to the print order server 41. That is, it automatically uploads. Since no human intervention is required from the occurrence of the event to the automatic upload, the information is transmitted to the print order server 41 in an extremely short time. By this automatic upload, the accumulated data in the factory DB 414C (see FIG. 10) of the print order server 41 is updated. By the way, even after the order destination determining unit 422 (see FIG. 10) of the print order server 41 places an order of the printing with the determined order destination, the order destination determining unit 422 monitors the occurrence of any event that affects the delivery date and/or quality through the accumulated data in the factory DB 414C.

Therefore, the order destination determining unit 422, which has detected the effect on the delivery date and/or quality, determines a new order destination that satisfies the conditions of request #1, and transmits a new order #1. The content of the new order #1 here differs depending on the progress of the printing and/or processing in the factory with which the previous order #1 is placed. For example, in case before the printing of the previous order #1 is started, all the printing is reordered to the newly determined order destination. If a part of the printing of the previous order #1 has already been completed, the remaining printing and the processing will be taken over by the newly determined order destination. In addition, as for placing the order of the remaining printing in case where the printing has already started, whether to place an order of the remaining printing in the complete sense or to reorder the entire requested printing is determined based on a predetermined rule. Of course, the same is applied to the processing.

<Processing Operation in the Third Stage>

Figure 21:
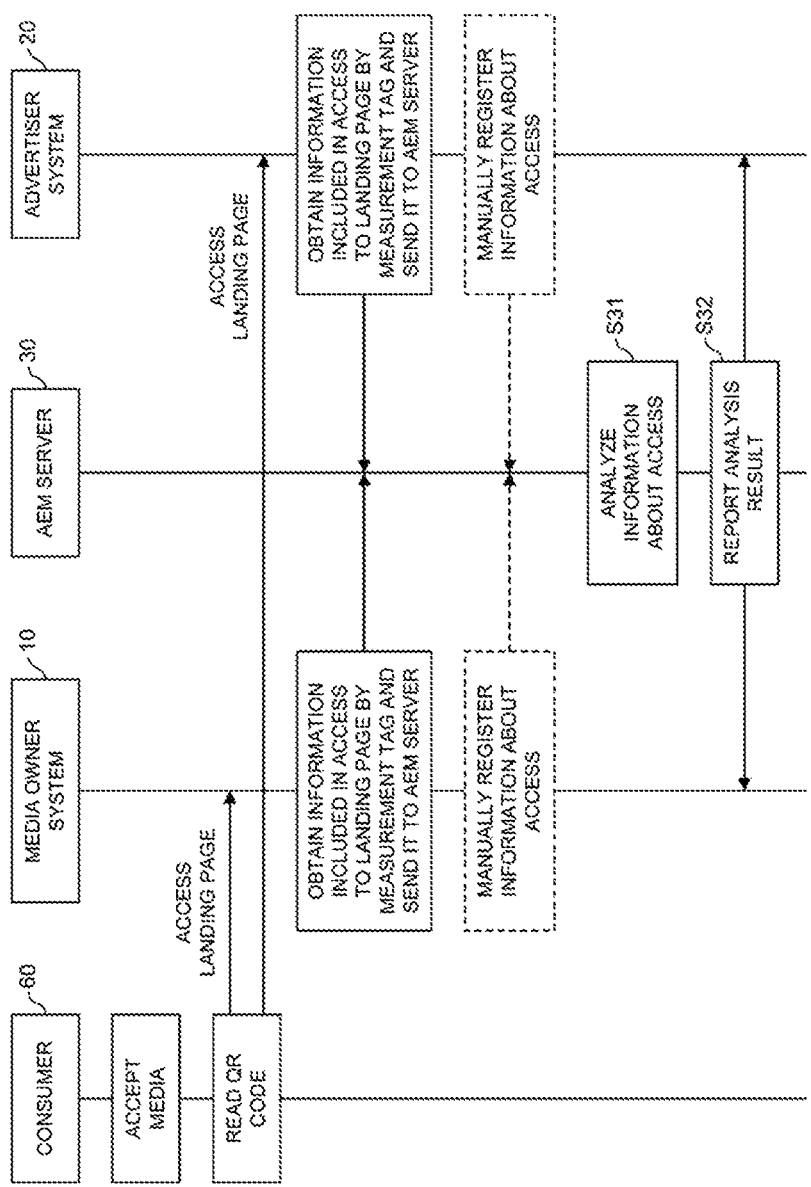
FIG. 21 is a diagram to explain a processing operation corresponding to the 3rd stage.

Here, the processing operation in the third stage will be described with reference to FIGS. 21 to 24. FIG. 21 is a diagram illustrating a processing operation corresponding to the third stage. The third stage corresponds to the analysis of the effectiveness of the media-sharing type advertisement. This stage is started by receiving, by the consumer 60 designated as the delivery destination, the paper media printed in the second stage. On the paper media in this embodiment, the QR code to lead to the landing page of the media owner and the QR code to lead to the landing page of the advertiser are printed. Here, it is assumed that the consumer 60 operates the mobile terminal 70 (see FIG. 1) and scans the QR code printed in the explanation column of the product or the like that he or she is interested in. By scanning the QR code, access to the corresponding landing page occurs.

For example, when the QR code corresponding to the media owner is scanned, the media owner system 10 obtains the information included in the access to the landing page with the measurement tag 14 (see FIG. 2), and transmits it to the advertising effectiveness measuring server 30. Similarly, when the QR code corresponding to the advertiser is scanned, the advertiser system 20 obtains the information included in the access to the landing page with the measurement tag 24 (see FIG. 4), and transmits it to the advertising effectiveness measuring server 30. FIG. 22 is a diagram depicting an example of information obtained by the advertising effectiveness measuring server 30 through the measurement tag 14 (see FIG. 2) or 24 (see FIG. 4). In the case of FIG. 22, information #1 is "media/advertisement information", information #2 is "media ID", information #3 is "target ID", and information #4 is "cookie information". and information #5 is "TBD (=To Be Determined)".

Information #1 is information representing whether the measurement target is the landing page of the media owner or the landing page of the advertiser. In this embodiment, a unique value is used for each measurement tag. Therefore, the information #1 obtained from the measurement tag on the media owner side is "media=XXX", and the information #1 obtained from the measurement tag on the advertiser side is "ad=YYY". Since "ad=YYY" is not included in the information used for accessing the landing page (see FIG. 17B), the information of the measurement tag for detecting the access is used. Information #2 is information representing the paper media that is the starting point of the access flowing into the landing page. In this embodiment, a value unique to the paper media (see FIG. 17A) described in the URL of the landing page is used. Therefore, the information #2 obtained from the measurement tag on the media owner side and the information #2 obtained from the measurement tag on the advertiser side both have the same value. In the example of FIG. 22, it is "media=XXX".

For information #3, a value unique to each delivery destination that is the target of the advertisement (see FIG. 17B) is used. Therefore, the information #3 obtained from the measurement tag on the media owner side and the information #3 obtained from the measurement tag on the advertiser side both have the same value. In the example of FIG. 22, it is "1234". Information #4 is cookie information acquired from the mobile terminal 70 (see FIG. 1) used by the consumer 60 (see FIG. 1) who is the delivery destination to scan the QR code. The cookie information is provided for the advertising effectiveness measuring server 30 when the permission of the consumer 60 is given. Information #5 is information provided according to the contract. In the case of FIG. 22, it is information of the mobile terminal 70, location information, and the like. If obtaining this information is not almost the same time as the detection of access to the landing page, the information on the date and time when the access was detected is also added.

Returning to the explanation of FIG. 21, as described above, the information contained in the access to the landing page is automatically notified of the advertising effectiveness measuring server 30 through the measurement tag, but it is possible that the media owner and the advertiser manually registers the access information to the advertising effectiveness measuring server 30. After that, the advertising effectiveness measuring server 30 analyzes the access information obtained from the media owner system 10 and the advertiser system 20 (step S31). The analysis here is executed by the access analyzer 331 (see FIG. 8). In the analysis by the advertising effectiveness measuring server 30, for example, the number of accesses that have flowed into each landing page and the access rate are calculated. Also, for example, the number and/or access rate of delivery destinations that have accessed both the landing pages of the media owner and the advertiser are calculated based on the identification information unique to the delivery destination. In this case, information about which landing page was accessed first is also specified.

FIG. 23 is a diagram illustrating an example of a table that manages the results of accesses to media owners and advertisers, which were analyzed using the identification information unique to the delivery destination. In the case of FIG. 23, the identification information of the delivery destination that accessed the landing page of the media owner X is "1234" and "9100". In addition, the identification information of the delivery destination that accessed the landing page of the media-sharing advertiser A is "5678" and "9100".From this, it can be seen that the identification information of the delivery destination that accessed the landing page of the media owner X and the landing page of the media-sharing advertiser A is "9100". In addition, from the information on the date and time of the accesses, it can be seen that the delivery destination whose identification information is "9100" first accessed the landing page of the media-sharing advertiser A. For the delivery destinations whose identification information is "1123" and "3985", no access to the landing page has been measured.

Returning to the explanation of FIG. 21, when the access is analyzed, the advertising effectiveness measuring server 30 reports the analysis result to both the media owner system 10 and the advertiser system 20 (step S32). FIG. 24 is a diagram depicting an example of a report of analyzing the effectiveness of the media-sharing type advertisement. This report will be provided to both the media owner X and the advertiser A, who placed the media-sharing type advertisement. The report depicted in FIG. 24 includes an access rate to the media owner X, an access rate to the advertiser A, and an access rate to both. The access rate to both includes information such as the number of people who first accessed the media owner X and the number of people who accessed the advertiser A first.

This information is information that cannot be known by the conventional measurement method in which the measurement result is concealed in the business entity corresponding to the QR code. In the case of the conventional measurement method, the access rate to the media owner X can be known only to the media owner X who manages the landing page. Similarly, the access rate to advertiser A can only be known to the advertiser A who manages the landing page. However, in the case of this embodiment, since the information of the partner of the media-sharing type advertisement can be obtained, the effectiveness of the media-sharing type advertisement can be evaluated numerically. The access rate to the media owner X is an example of the first result, and the access rate to the advertiser A is an example of the second result. In addition, information such as the access rate to both or the like is information that cannot be known at all by the conventional measurement method. Information such as the access rate to both can be obtained only when the advertising effectiveness measuring server 30 manages the identification information of the delivery destination. The access rate to both here is an example of the third result. Moreover, since information regarding which advertisement the delivery destination was interested in first can be obtained as the number of people or the ratio, it is possible to re-evaluate future advertisement plans, advertisement costs, and/or like.

The report depicted in FIG. 24 exemplifies the case where one advertiser places a media-sharing type advertisement on one direct mail postcard, but when plural advertisers place advertisements in different advertisement spaces, the report may include individual access rates for plural advertisers. The access rate to each advertiser here is an example of the fourth result. Further, in this case, information such as the access rate from the same delivery destination can be evaluated for each combination of plural business entities and included in the report. For example, an access rate from the same delivery destination to all of the media owner and advertiser #1 and advertiser #2, an access rate from the same delivery destination to both of the media owner and advertiser #1, an access rate from the same delivery destination to both of the media owner and advertiser #2, and an access rate from the same delivery destination to both of the advertisers #1 and #2 can be included.

Embodiment 2

Subsequently, the second embodiment using the paper advertisement system 1 (see FIG. 1) will be described. In the aforementioned first embodiment, when the QR code is scanned by the mobile terminal 70 (see FIG. 1), the landing page of the business entity corresponding to the scanned QR code is directly accessed, but in this embodiment, it is assumed that the landing page of the corresponding business entity is accessed via a redirect server. In this embodiment, the advertising effectiveness measuring server 30 (see FIG. 1) is used as a redirect server that redirects access to itself to the corresponding landing page. Therefore, in this embodiment, a function to generate a QR code that includes a URL to redirect the delivery destination to the landing page of each business entity is provided in the QR code generator 327 (see FIG. 7B), which is one of the functions executed by the advertising effectiveness measuring server 30. In the following, the server to which that function is added is referred to as an advertising effectiveness measuring server 30A (see FIG. 25).

FIG. 25 is a diagram to explain a portion of the processing operations of the advertising effectiveness measuring server 30A used in the second embodiment. In FIG. 25, reference numerals corresponding to the portions pertinent to those in FIG. 16 are added and depicted. As will be described later, the advertising effectiveness measuring server 30A measures the content of accesses to each business entity in the process of redirecting the accesses to the URL for each business entity to the corresponding landing page. Among the processing operations depicted in FIG. 25, the processing operation peculiar to this embodiment is step S14A relating to the generation of the QR code. At the step S14A, a QR code including a URL for redirecting the access from the delivery destination to the landing page of each business entity is generated. Of course, the QR code also includes identification information for each delivery destination.

Figure 26A:
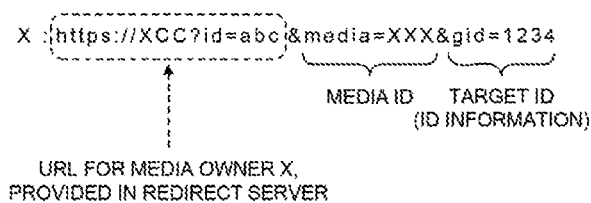
FIG. 26A is a diagram depicting an example of information included in a QR code for the media owner X in case of the consumer P as a delivery destination.
Figure 26B:
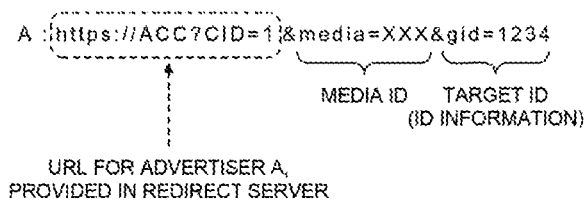
FIG. 26B is a diagram depicting an example of information included in a QR code for the advertiser A in case of the consumer P as a delivery destination.

FIGS. 26A and 26B are diagrams to explain an example of information included in the QR code generated for each business entity. FIG. 26A depicts an example of the information included in the QR code for the media owner X whose delivery destination is the consumer P, and FIG. 26B depicts the information included in the QR code for the advertiser A whose delivery destination is the consumer P. In FIGS. 26A and 26B, reference numerals corresponding to the portions pertinent to those in FIGS. 17A and 17B are added and depicted. In the case of FIG. 26A, the information included in the QR code for the media owner X includes the URL for the media owner X provided in the redirect server. Here, it is "https://XCC?id=abc". Of these, "id=abc" is an address prepared for the media owner. On the other hand, in the case of FIG. 26B, the information included in the QR code for the advertiser A includes the URL for the advertiser A provided in the redirect server. Here, it is "https://ACC?CID=1". Of these, "CID=1" is an address prepared for the advertiser A. When the QR codes including the information depicted in FIGS. 26A and 26B are generated, print data for each delivery destination is generated.

Figure 27:
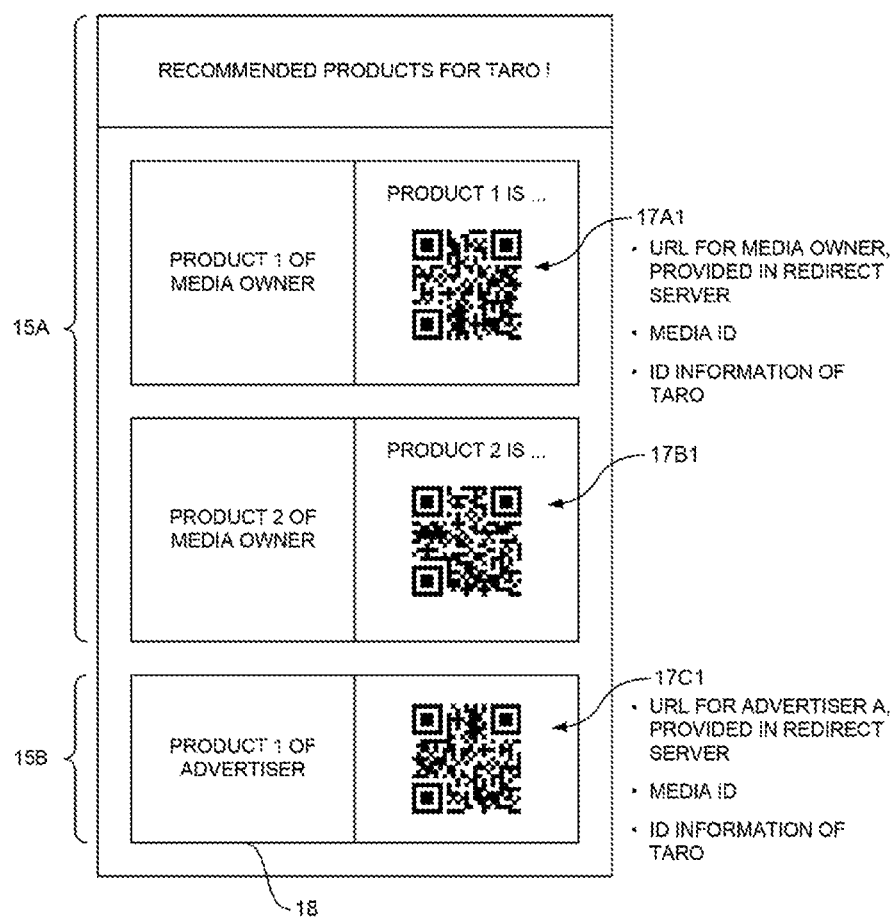
FIG. 27 is a diagram to explain a schematic example of the print data generated for each delivery destination.

FIG. 27 is a diagram illustrating a schematic example of the print data generated for each delivery destination. In FIG. 27, reference numerals corresponding to the portions pertinent to those in FIG. 18 are added and depicted. In the case of this embodiment, the QR codes 17A1 and 17B1 include information on the URL for the media owner, which is provided in the redirect server, instead of the URL for the landing page of the media owner. Further, the QR code 17C1 includes information on the URL for the advertiser, which is provided in the redirect server, instead of the URL of the landing page of the media-sharing advertiser. The image data corresponding to the QR codes 17A1 and 17B1 here is an example of the first code, and the image data corresponding to the QR code 17C1 is an example of the second code. Furthermore, the QR codes 17A1 and 17B1 are examples of the first image, and the QR code 17C1 is an example of the second image. The generated print data is transmitted from the advertising effectiveness measuring server 30A to the print order server 41 (see FIG. 25). After that, sequentially, the print order server 41 places the printing order with the printing company system 45 (see FIG. 1), and the delivery company 50 (see FIG. 1) delivers the paper media to the delivery destination.

Figure 28:
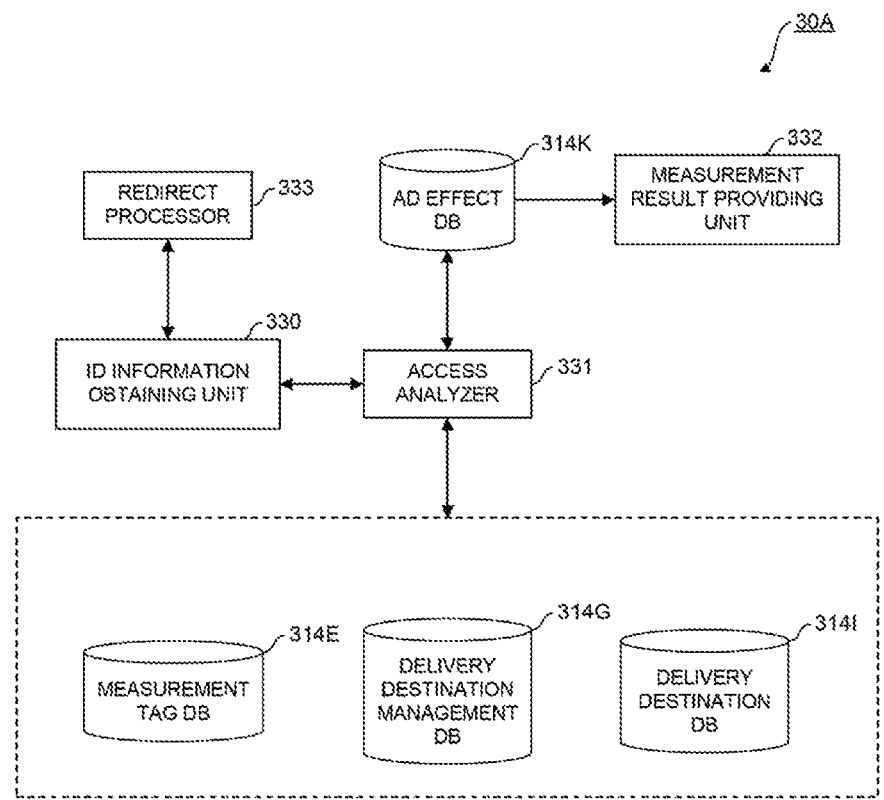
FIG. 28 is a diagram to explain configurational parts corresponding to the advertising effectiveness measuring function of the advertising effectiveness measuring server used in the embodiment 2.

Subsequently, the measurement process of the advertising effectiveness of each business entity by the advertising effect measuring server 30A will be described. FIG. 28 is a diagram illustrating component portions corresponding to the advertising effectiveness measuring function in the advertising effectiveness measuring server 30A used in the second embodiment. In FIG. 28, reference numerals corresponding to the portions pertinent to those in FIG. 8 are added and depicted. A new part of the functions depicted in FIG. 28 is the redirect processor 333. The redirect processor 333 depicted in FIG. 28 is a program that redirects the access to the URL for each business entity, which is provided in its server operating as the redirect server to the landing page of the corresponding business entity. For example, when the access destination from the QR code is the URL for the media owner, which is provided in its server, the redirect processor 333 redirects the access to the landing page 13B (see FIG. 2) of the media owner. Furthermore, when the access destination from the QR code is the URL for the advertiser, which is provided in its server, the redirect processor 333 redirects the access to the landing page 23B (see FIG. 4) of the advertiser.

Figure 29:
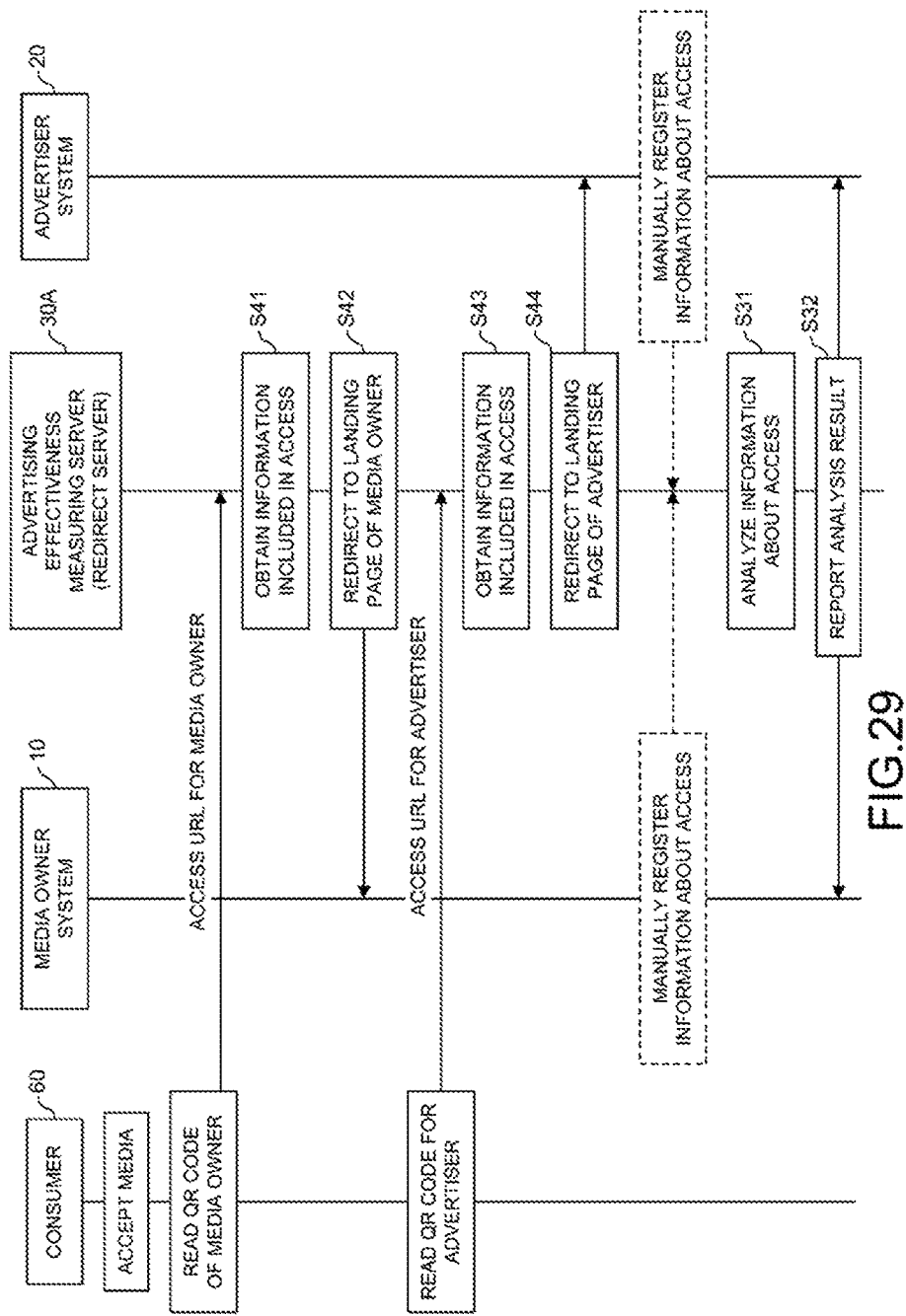
FIG. 29 is a diagram to explain a redirect process and analysis of accesses by the advertising effectiveness measuring server used in the embodiment 2.

The redirect processor 333 in this embodiment also has a function of extracting information from the access flowing into its server and giving it to the identification (ID) information obtaining unit 330 in the process of redirecting the access. FIG. 29 is a diagram to explain redirection processing and access analysis by the advertising effectiveness measuring server 30A used in the second embodiment. In FIG. 29, reference numerals corresponding to portions pertinent to FIG. 21 are added and depicted. For example, when the consumer 60 scans the QR code printed in the explanation column of the media owner's product or the like, the mobile terminal 70 (see FIG. 1) used to scan the QR code accesses to the advertising effectiveness measuring server 30A as a destination with the URL for the media owner, which is provided in the advertising effectiveness measuring server 30A. In this case, the advertising effectiveness measuring server 30A obtains the information included in the access by the redirect processor 333 (see FIG. 28) described above (step S41), and then redirects the access to the landing page 13B of the media owner (see FIG. 2) (step S42). The obtained information is stored in, for example, the advertisement effect DB 314K (see FIG. 8) as a measurement result of the access to the media owner.

On the other hand, when the consumer 60 scans the QR code printed in the explanation column of the advertiser's product or the like, the mobile terminal 70 (see FIG. 1) used for scanning the QR code accesses the advertising effectiveness measuring server 30A as a destination with the URL of the advertiser, which is provided in the advertising effectiveness measuring server 30A. In this case as well, the advertising effectiveness measuring server 30A obtains the information included in the access by the redirect processor 333 described above (step S43), and then redirects the access to the advertiser's landing page 23B (see FIG. 4) (see step S44). The obtained information is stored in, for example, the advertisement effect DB 314K as a measurement result of the access to the advertiser.

In the case of this embodiment as well, both the media owner and the advertiser can manually register the accesses. After that, the advertising effectiveness measuring server 30A analyzes the access information obtained from the media owner system 10 and the advertiser system 20 (step S31), and reports the analysis result to both the media owner system 10 and the advertiser system 20. (Step S32). The content of the report is the same as that of the embodiment. That is, even when the redirect server is used as in this embodiment, the QR code printed on the delivered paper media includes the identification information unique to the delivery destination, so that it becomes possible to analyze the effectiveness of the media-sharing type advertisement and provide that information.

Other Embodiments

Although the embodiments of this invention have been described above, the technical scope of this invention is not limited to the scopes described in the above-described embodiments. For example, it is clear from the description of the claims that the above-described embodiment with various modifications or improvements is also included in the technical scope of this invention.

Other Example 1

In the above-described embodiments, the delivery of the direct mail postcard is illustrated as the usage form of the paper advertisement system 1 (see FIG. 1), but the usage form of the paper advertisement system 1 is not limited to the delivery of the direct mail postcard. FIG. 30 is a diagram to explain various usage examples of the paper advertisement system. The first line from the top corresponds to the first and second embodiments. That is, the delivered object is a direct mail postcard. In this case, the media owner is the shipper or the like of the direct mail postcard. The advertiser is arbitrary, and the delivery destination is a consumer or the like. The advertiser is determined according to the consumer or the like who is the delivery destination, in addition to satisfying the conditions for the media-sharing type advertisement. Therefore, there are multiple combinations of the media owner and advertiser. In the case of this example, because the media owner grasps the effectiveness of the advertisement not only for himself but also for the other party who places the advertisement together, the media owner can analyze the advertisement worth of his customers and/or the paper media shipped by his company. On the other hand, it becomes possible for an advertiser who has placed the media-sharing advertisement to measure the effectiveness caused by placing the advertisement of its own product or the like together with the product or the like of the media owner side in more detail.

The second line from the top is the case where the delivered object is a book such as a catalog and magazine. In this case, the media owner is a publisher, a shipper, or the like of the catalog or the like. Again, the advertiser is optional. The delivery destination is a subscriber of the catalog or the like. In the case of books, the page on which a QR code is printed that includes a URL that guides the consumer or the like who is the delivery destination to the landing page of the media owner and the page on which a QR code that includes a URL that guides the consumer or the like who is the delivery destination to the landing page of the advertiser are not limited to the same page. For example, the QR code including the URL that leads to the landing page of the media owner is printed on the front or back covers, and the QR code including the URL that leads to the landing page of the advertiser is printed on the advertisement page. Therefore, the print data generator 328 (see FIG. 7B) generates print data in which the two QR codes are associated with each other so that the QR codes having different delivery destinations are not mixed in the book after binding. For example, the file name of the print data includes a code, a number or the like to identify the delivery destination. The same applies to photo books, information magazines, and flyers, which will be described later. The third line from the top is the case where the delivered object is a photo book. In this case, the media owner is the business entity (that is, the trustee) who has been entrusted with the creation of the photo book. Again, the advertiser is optional. The delivery destination will be the person who placed the order such as the consumer who placed an order of the creation of the photo book with the media owner. The fourth line from the top is the case where the delivered object is an information magazine according to the attributes of the traveler. The information magazine here is assumed to be, for example, a magazine whose paper is customized according to the interests of individual travelers and/or group travelers. In this case, the media owner is a travel company, an accommodation company, or the like. It may be a company planning a trip. Again, the advertiser is optional. The delivery destination will be the accommodation place where the traveler stays. If you board a chartered bus or the like before arriving at the accommodation, the transportation office of the vehicle to be boarded may be used as the delivery destination.

Figure 31:
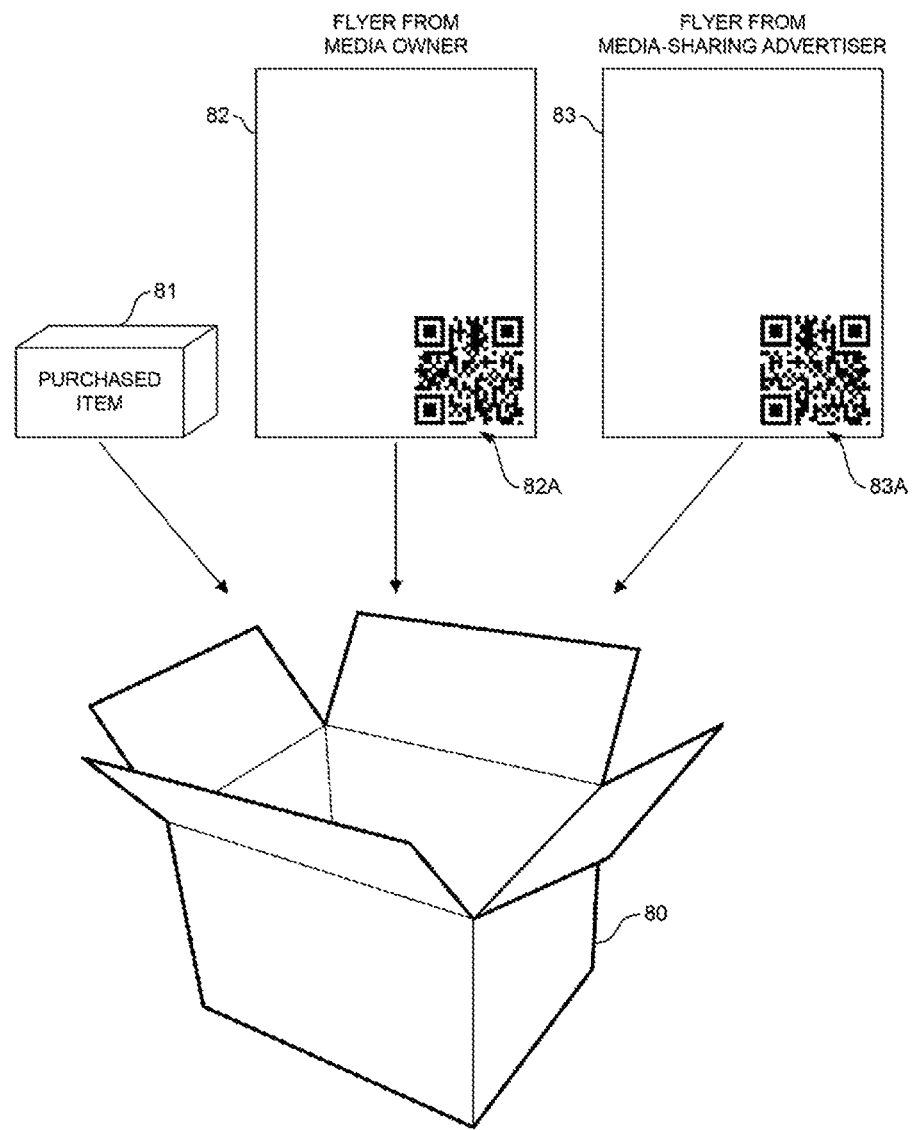
FIG. 31 is a diagram to explain bundled advertisements.

The fifth line from the top is the case where the delivered object is a flyer included in the purchased items of the online shopping. These flyers are also called flyers shipped together. In this case, the media owner is an online shopping business entity or the like that ships the purchased items. Again, the advertiser is optional. The delivery destination of the flyer is the purchaser or the like. However, when the place where the flyer is printed and the place where the purchased item is packed are different, the delivery destination of the flyer is the place where the purchased item is packed. FIG. 31 is a diagram to explain the envelope stuffer. The example depicted in FIG. 31 depicts an example in which the flyer 82 of the media owner and the flyer 83 of the media-sharing advertiser are packed when the purchased item is packed in the cardboard box 80. As in the direct mail postcard described above, both the advertisement of the media owner and the advertisement of the media-sharing advertiser may be printed on one flyer.

In the case of FIG. 31, a QR code 82A including a URL of a landing page or the like of the media owner and identification information unique to the consumer who is the delivery destination of the purchased item is printed on the flyer 82 of the media owner. The QR code 82A here is an example of the first image, and the image data corresponding to the QR code 82A is an example of the first code. Furthermore, a QR code 83A including a URL of a landing page or the like of the advertiser and identification information unique to the consumer who is the delivery destination of the purchased item is printed on the flyer 83 of the media-sharing advertiser. The QR code 83A here is an example of the second image, and the image data corresponding to the QR code 83A is an example of the second code. Even in the case of the flyers shipped together, the print data of the flyer for the advertisement of the media owner and the print data of the flyer for the advertiser may be combined into one piece of the print data. However, when the print data of the flyer for the advertisement of the media owner and the print data of the flyer for the advertiser are different, information to identify the delivery destination is attached to each of the print data so that the flyers whose delivery destination is the same are packed in the cardboard box 80. The print data generator 328 (see FIG. 7B) also generates print data to which information to identify the delivery destination is added. In the case of the flyer shipped together, the flyer of the media-sharing advertiser is also treated as one form of the flyer of the media owner. This is because the flyer of the media-sharing advertiser is subordinate to the flyer of the media owner. Therefore, the flyer of the media-sharing advertiser in the flyers shipped together is also one form of the flyer delivered by the media owner.

Other Example 2

Figure 32A:
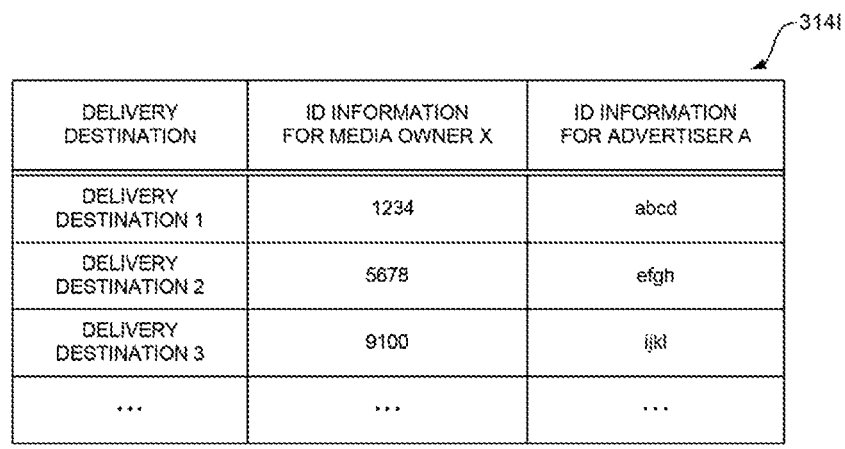
FIG. 32A is a diagram depicting an example of the delivery destination DB which manages different identification information for each business entity even in case of the same delivery destination.

In the case of the above-described embodiments, the case where the identification information for each delivery destination is one for each delivery destination has been described, however, the identification information may differ for each business entity that places the media-sharing type advertisement, or different identification information may be used for each order of the printing and delivery. FIGS. 32A and 32B are diagrams to explain other generation examples of identification information for each delivery destination. FIG. 32A depicts an example of the delivery destination DB 314I to manage different identification information for each business entity even if the delivery destination is the same, and FIG. 32B depicts an example of the delivery destination DB 314I to manage different identification information for each order even if the delivery destination is the same. In the case of the delivery destination DB 314I depicted in FIG. 32A, for the delivery destination 1, "1234" is recorded as the identification information for the media owner X, while in the case of FIG. 32B, "abcd" is recorded as the identification information for the advertiser A. By assigning plural kinds of identification information to the same person in this way, the business entity who can know the relationship between plural kinds of identification information can be limited to the intermediary company who operates the advertising effectiveness measuring server 30.

On the other hand, in the case of the delivery destination DB 314I depicted in FIG. 32B, the delivery destination DB 314I corresponding to the order #1 records "1234" as the identification information unique to the delivery destination 1, whereas the delivery destination DB 314I corresponding to the order #2 records "2345" as the identification information unique to the delivery destination 1. In this way, it is possible to make it difficult to predict the delivery destination by using different identification information for each order. In addition, it becomes possible to analyze the effectiveness of advertisements by distinguishing each order. The method of changing the identification information of the delivery destination for each order can be applied even when different identification information is used for each delivery destination depicted in FIG. 32A. However, changing the identification information for each order may be applied only for the identification information for the media owner, or only for the identification information for the advertiser.

Other Example 3

In the above-described embodiments, as described with reference to FIG. 16, when a specific action for the service site of the media owner is detected, the printing and delivery of the paper media whose delivery destination is the consumer 60 who took the action (FIG. 16) is ordered, however, the media owner may place an order for the printing and delivery of the paper media with the advertising effectiveness measuring server 30 by designating the delivery destinations with the voluntary determination of the media owner regardless of the access to the service site by the consumer 60. For example, the purchase history and the like of the consumer 60 in the actual store may be used as a trigger for placing an order for the printing and delivery of the paper media with the advertising effectiveness measuring server 30. The purchase history and the like does not need to include information such as the name and address of the consumer 60, but should be linked to the name and address of the consumer 60 via management information and the like.

Other Example 4

In the above-described embodiments, a case was explained where the QR code including the URL for leading the delivery destination to the landing page opened by the media owner or the advertiser and the identification information for each delivery destination or the QR code including the URL to redirect the access from the delivery destination to the landing page is printed on the surface of the paper media. However, the aforementioned URL and the identification information for each delivery destination may be recorded in an RFID tag embedded in or attached to the paper media. Different RFID tags are embedded in the advertisement space of the media owner and the advertisement space of the advertiser. The RFID tag is an IC (=Integrated Circuit) tag capable of wireless communication over a short distance. The RFID tag contains an antenna and an IC chip. In the case of this embodiment, a passive IC tag that receives the power required for the operation from the outside is assumed. However, the active IC tag with a built-in battery is not excluded. When the RFID tag is used, it is not necessary to generate a QR code. Therefore, instead of the QR code generator 327 (see FIG. 7B), a function unit for generating a code for each company, which includes the above-mentioned URL and identification information for each delivery destination, is prepared. The function unit here is an example of the code generator.

Further, when the RFID tag is used, it is not necessary to print the QR code 17A and the like (see FIG. 18) on the paper media. On the other hand, in one paper media, there are a case where the RFID tag for the media owner and the RFID tag for the advertiser are embedded separately, and a case where only one RFID tag for both the media owner and the advertiser is embedded. The same applies when the redirect server is used. In each case, the code generated for the same delivery destination needs to be written to an RFID tag embedded in the corresponding media. Among the data to be written in the RFID tag, the information for measuring the access to the advertisement of the media owner (for example, the information depicted in FIG. 17A) is an example of the first code, and the information for measuring the access to the advertisement of the advertiser (for example, the information depicted in FIG. 17B) is an example of the second code.

For example, when one paper media has two RFID tags, one for the media owner and one for the advertiser, it is necessary that the code for the media owner (corresponding to the first code) is written into the RFID tag, which is embedded in the advertisement of the media owner, and the code for the advertiser (corresponding to the second code) is written into the RFID tag, which is embedded in the advertisement of the advertiser. The writing of each code into the RFID tag may be performed by the print order server 41, the printing company system 45, or the delivery company 50. The data to be written in the RFID tag is supplied by the advertising effectiveness measuring server 30. At this time, the advertising effectiveness measuring server 30 may generate writing data for each delivery destination and supply it to the print order server 41 or the like. In this case, the advertising effectiveness measuring server 30 generates writing data having a data structure of (code for media owner, code for advertiser) for each delivery destination. However, the advertising effectiveness measuring server 30 may not generate writing data for each delivery destination, and may extract and write the code corresponding to each RFID tag each time writing to the RFID tag.

The RFID reader built into the mobile terminal 70 may be used to read the information recorded in the RFID tag. The operation after reading is the same as that of the above-described embodiments. The timing to write the URL for leading the delivery destination to the landing page opened by the media owner and/or the advertiser on the RFID or the URL for redirecting the access from the delivery destination to the landing page of each business entity may be before or after printing on the paper media for each delivery destination. On the other hand, when there is only one RFID tag, data including both the URLs for leading the delivery destination to the landing pages opened by the media owner and/or the advertiser or the URLs for redirecting the access from the delivery destination to the landing page of each business entity is written into the corresponding RFID tag. In this case, when the RFID tag is read, a screen to ask the user which landing page to access is displayed.

Other Example 5

In the above-described embodiments, the print order server 41 is used to place an order for printing the paper media with the printing company system 45, however, it is possible to place an order for printing the paper media, without using the print order server 41. For example, an order for printing of the paper media may be placed collectively with a specific printing company specified in a contract or the like.

Other Example 6

In the above-described embodiments, the advertising effectiveness measuring server 30 has been described as an example of the advertising effectiveness measurement system, however, the scope of the advertising effectiveness measurement system may include the print order server 41, the printing company system 45 and like. In addition, the delivery company 50 may be included as a part of the advertising effectiveness measurement system.

Other Example 7

In the above-described embodiments and other examples, the generation of the QR code and the like used to measure the effectiveness of the media-sharing type advertisement is started as the trigger that an order for printing the paper media is placed by the media owner with a business entity to measure the effectiveness of the advertisement, however, the trigger to start the generation of the QR code and the like is not limited to the order for printing of the paper media. For example, the generation of the QR code may be started by a request or instruction to generate personalized data for each delivery destination of the paper media as a trigger. This example is used when the media owner prints by himself or when the media owner prints the media at a factory with which the media owner is individually affiliated. Furthermore, also when the media owner and the company who measures the effect of the advertisement are unified, the generation of the QR code is started without the order for printing the paper media. In this case, the media owner system 10 (see FIG. 1) functions as a terminal for requesting or instructing the generation of the QR codes used to measure the media-sharing type advertisement. Even in this case, the advertising effectiveness measuring server 30 determines an advertiser who satisfies the predetermined conditions of the media-sharing type advertisement.

Other Example 8

In the case of the above-described embodiments and other examples, the content or type of the product or service advertised by the media owner is not registered in the media DB 314C (see FIG. 5), and the content or type of the product or service on the media owner side, which is desired by the advertiser, is not registered in the advertisement DB 314D (see FIG. 5). However, the information to be registered in the media DB 314C may include the content or type of the product or service advertised by the media owner, and the information to be registered in the advertisement DB 314D may include the content or type of the product or service on the media owner side, which is desired by the advertiser.

The contents or types of products include, for example, food names, food genres such as Japanese, Western, and Chinese, classification such as adult clothes, children's clothes, men's clothes, and women's clothes, names and/or classifications such as jackets, pants, and underwear, contents and/or classification of teaching materials, names and/or classifications of camp equipments, names and/or classifications of the golf equipment, and car names and types. The contents or types of services include, for example, names and/or contents of educational services, names and/or contents of food and drink services, names and/or contents of transportation services, names and/or contents of carrier services, names and/or contents of human resources services, and names and/or contents of communication services. If this information is registered, it becomes possible that the advertiser's wishes are more accurately reflected when the advertising effectiveness measuring server 30 (see FIG. 14) presents matching candidates (that is, when presenting at step S4 in FIG. 14).

In addition, the information to be registered in the media DB 314C may include the content or type of the advertiser's product or service desired by the media owner, and the information to be registered in the advertisement DB 314D may include the content or type of the product or service advertised by the advertiser. If such information is registered, it becomes possible to more accurately reflect the wishes of the media owner at the stage where the advertising effectiveness measuring server 30 presents matching candidates. The information to be registered in the media DB 314C and the advertisement DB 314D may include both the content or type of the product or service on the advertiser side, which is desired by the media owner, and the content or type of the product or service on the media owner side, which is desired by the advertiser. Of course, in such a case, the content or type of the product or service of the partner, which is necessary to present the matching candidates is registered in the media DB 314C and the advertisement DB 314D.

In addition, the content or type of the product or service to be excluded from the partner of the media-sharing type advertisement may be registered in the media DB 314C and the advertisement DB 314D. In this case, it is possible to reduce the possibility that the content or type of the product or service presented as the matching candidate on the partner side is different from the wishes of the media owner or the advertiser. Further, in the media DB 314C and the advertisement DB 314D, the type of industry of the partner to be excluded from the partner of the media-sharing type advertisement may be registered. In this case, it is possible to reduce the possibility that a partner whose type of industry of the partner presented as a matching candidate does not match its own products or service is presented as a matching candidate.

Other Example 9

In the case of the above-described embodiments and other examples, the manuscript data (see FIG. 3) transmitted from the print request server 10A (see FIG. 2) to the advertising effectiveness measuring server 30 (see FIG. 1) contains a personal name or title unique to each delivery destination of the direct postcard, however, the area 15A (see FIG. 3) used for the advertisement and the like of the media owner may include personal name or the like unique to each delivery destination of the direct postcard. The personal name or the like may be included at the stage of the manuscript data prepared by the media owner, however, may be inserted by the advertising effectiveness measuring server 30 at the stage of generating the print data (see FIG. 18). The insertion of the personal name or the like by the advertising effectiveness measuring server 30 may be limited to the case where an area for inserting or replacing the personal name or the like is prepared in the image data of the product or the like, which is provided by the media owner. However, when the media owner permits, even if there is no area for inserting or replacing the personal name or the like, a personal name or the like unique to each delivery destination can be added in the blank part or by changing the layout.

Furthermore, in the explanation of the print data of the direct postcard depicted in FIG. 18, it was not explained that the area 15B (see FIG. 18) to which the advertiser's advertisement is to be allocated includes a personal name or the like unique to each delivery destination of the direct postcard, however, as in the area 15A for the media owner (see FIG. 18), a personal name or the like unique to each delivery destination may be recorded. The insertion of the personal name or the like by the advertising effectiveness measuring server 30 may be limited to the case where an area for inserting or replacing the personal name or the like is prepared in the image data of the product or the like, which is provided by the advertiser. However, when the advertiser permits, even if there is no area for inserting or replacing the personal name or the like, a personal name or the like unique to each delivery destination can be added in the blank part or by changing the layout.

The embodiments described above can be summarized as follows:

An advertising effectiveness measurement system according to a first aspect includes: (A) a first generator to generate data that is to be recoded on a print media of a first business entity and is personalized for each delivery destination, and to generate a first code including an address of a first landing page corresponding to the first business entity and first identification information to identify a delivery destination of the print media; (B) a second generator to generate data that is to be recoded on the print media and is personalized for each delivery destination, and to generate a second code including an address of a second landing page corresponding to one or plural second business entities that satisfy a predetermined media-sharing condition and second identification information to identify a delivery destination of the print media; (C) a first obtaining unit to obtain, through a first tag for measurement of accesses, which is embedded in the first landing page, information to identify the first tag and the first identification information to identify the delivery destination that is an access source; (D) a second obtaining unit to obtain, through a second tag for measurement of accesses, which is embedded in the second landing page, information to identify the second tag and the second identification information to specify the delivery destination that is an access source; and (E) a measurement result providing unit to provide the second business entity with a first result of measuring accesses to the first landing page, and to provide the first business entity with a second result of measuring accesses to the second landing page.

According to the first aspect, it is possible to provide plural business entities that placed advertisements in a media-sharing form with information of the advertising effectiveness in the other business entity each other.

An advertising effectiveness measuring system according to a second aspect includes: (A) a first generator to generate data that is to be recoded on a print media of a first business entity and is personalized for each delivery destination, and to generate a first code including an address for which an address of a first landing page corresponding to the first business entity is set as a redirect destination and first identification information to identify a delivery destination of the print media; (B) a second generator to generate data that is to be recoded on the print media and is personalized for each delivery destination, and to generate a second code including an address for which an address of a second landing page corresponding to one or plural second business entities that satisfy a predetermined media-sharing condition is set as a redirect destination and second identification information to identify a delivery destination of the print media; (C) a first obtaining unit to obtain, through logs of accesses that were redirected to the first landing page, information regarding the redirect destination and the first identification information to identify the delivery destination that is an access source; (D) a second obtaining unit to obtain, through logs of accesses that were redirected to the second landing page, information regarding the redirect destination and the second identification information to identify the delivery destination that is an access source; and (E) a measurement result providing unit to provide the second business entity with a first result of measuring accesses to the first landing page, and to provide the first business entity with a second result of measuring accesses to the second landing page.

According to the second aspect, it is possible to provide plural business entities that placed advertisements in a media-sharing form with information of the advertising effectiveness in the other business entity each other.

The measurement result providing unit according to the first or second aspect may include a third result of measuring accesses from the same delivery destination to the first landing page and the second landing page in the first result and the second result.

In this way, it is possible to provide information such as the number of people who access both for plural business entities who placed the advertisements in the media-sharing form.

The third result may include a before and after relationship between accesses from the same delivery destination to the first landing page and the second landing page.

In this way, it is possible to provide information of the before and after relationship between accesses from the same delivery destination that accessed both.

The measurement result providing unit according to the first aspect or the second aspect may include a fourth result of measuring accesses from the same delivery destination to second landing pages respectively corresponding to plural second business entities in case of plural second business entities.

In this way, it is possible to provide information regarding the advertising effectiveness in other business entities each other even in case of the plural second business entities who placed the advertisement in the media-sharing form.

The aforementioned generation of the personalized data may be executed resulting from a consumer's action. In this way, it is possible to provide information of the advertising effectiveness, which relates to consumers who have high correlation with the purchase action, for the plural business entities that placed the advertisements in the media-sharing form.

Even for the same delivery destination, both or either of the first identification and the second identification information may be changed whenever the personalized data is generated. In this way, it is possible to make it difficult to estimate the delivery destination corresponding to the identification information.

The first identification information and the second identification information may be the same. It is possible to simplify the management of the identification information in the system.

An advertising effectiveness measuring system according to a third aspect includes: (A) when data that is to be recorded on a print media of a first business entity and is personalized for each delivery destination includes a first code including an address of a first landing page corresponding to the first business entity and first identification information to identify a delivery destination of the print media and a second code including an address of a second landing page corresponding to one or plural business entities that satisfy a predetermined media-sharing condition and second identification information to identify a delivery destination of the print media, (B) a first obtaining unit to obtain, through a first tag for measurement of accesses, which is embedded in the first landing page, information to identify the first tag and the first identification information to identify the delivery destination that is an access source; (C) a second obtaining unit to obtain, through a second tag for measurement of accesses, which is embedded in the second landing page, information to identify the second tag and the second identification information to identify the delivery destination that is an access source; and (D) a measurement result providing unit to provide the second business entity with a first result of measuring accesses to the first landing page, and to provide the first business entity with a second result of measuring accesses to the second landing page.

According to the third aspect, it is enabled to analyze the effectiveness of the media-sharing type advertisement when the plural business entities place the advertisements in the media-sharing form.

An advertising effectiveness measuring system according to a fourth aspect includes: (A) when data that is to be recoded on a print media of a first business entity and is personalized for each delivery destination includes a first code including an address for which an address of a first landing page corresponding to the first business entity is set as a redirect destination and first identification information to identify a delivery destination of the print media and a second code including an address for which an address of a second landing page corresponding to one or plural second business entities that satisfy a predetermined media-sharing condition is set as a redirect destination and second identification information to identify a delivery destination of the print media; (B) a first obtaining unit to obtain, through logs of accesses that were redirected to the first landing page, information regarding the redirect destination and the first identification information to identify the delivery destination that is an access source; (C) a second obtaining unit to obtain, through logs of accesses that were redirected to the second landing page, information regarding the redirect destination and the second identification information to identify the delivery destination that is an access source; and (E) a measurement result providing unit to provide the second business entity with a first result of measuring accesses to the first landing page, and to provide the first business entity with a second result of measuring accesses to the second landing page.

According to the fourth aspect, it is enabled to analyze the effectiveness of the media-sharing type advertisement when the plural business entities place the advertisements in the media-sharing form.

An advertising effectiveness system according to a fifth aspect includes: (A) a first generator to generate first data that is to be recorded on a print media of a first business entity and is personalized for each delivery destination of the print media and includes a first code, wherein the first code includes a first address to access a first landing page corresponding to the first business entity by a user of the delivery destination of the print media and delivery destination identification information to identify the delivery destination of the print media; (B) a second generator to generate second data that is to be recorded on the print media and is personalized for each delivery destination of the print media and includes a second code, wherein the second code includes a second address to access a second landing page corresponding to a second business entity that satisfies a predetermined media-sharing condition by a user of the delivery destination of the print media; (B) a first obtaining unit to obtain the delivery destination identification information identified according to an access to the first address, which is based on the first code, and the identification information to identify the print media of the first business entity; (C) a second obtaining unit to obtain the delivery destination identification information identified according to an access to the second address, which is based on the second code, and identification information to identify the second business entity; and (D) a providing unit to provide the second business entity with a first result measured for accesses to the first landing page from users of delivery destinations in association with the identification information to identify the print media and to provide the first business entity with a second result measured for accesses to the second landing page from users of delivery destinations in association with the identification information to identify the second business entity.

In addition, in the fifth aspect, the second code may include the identification information to identify the print media of the first business entity, and the second obtaining unit may further obtain the identification information to identify the print media. In this case, the second result includes a result of measuring accesses to the second landing page from the user of the delivery destination in association with the identification information to identify the second business entity and the identification information to identify the print media.

Moreover, in the fifth aspect, the first obtaining unit may further obtain the identification information to identify the print media of the first business entity. In this case, the first result includes a result measured for accesses to the first landing page from the users of the delivery destinations in association with the identification information to identify the print media of the first business entity.

In addition, the first code may further include the identification information to identify the print media of the first business entity.

Furthermore, in the fifth aspect, the first address may be an address of the first landing page. In this case, the first obtaining unit may obtain the delivery destination identification information identified by a tag embedded in the first landing page in response to an access to the first landing page, which is based on the first code. Moreover, in the fifth aspect, the second address may be an address of the second landing page. In this case, the second obtaining unit may obtain the delivery destination identification information identified by a tag embedded in the second landing page in response to an access to the second landing page, which is based on the second code.

Moreover, in the fifth aspect, the first address may be an address for causing to redirect to the first landing page. In this case, the first obtaining unit may obtain the delivery destination identification information identified based on an access to the first address, which is based on the first code, and a log of redirecting to the first landing page. In addition, in the fifth aspect, the second address may be an address for causing to redirect to the second landing page. In this case, the second obtaining unit may obtain the delivery destination identification information identified based on an access to the second address, which is based on the second code, and a log of redirecting to the second landing page.

Further, in the fifth aspect, the providing unit may provide a third result measured for accesses to the first landing page and the second landing page from the same delivery destination. The third result may include information regarding which of an access to the first address and an access to the second address occurred first.

Moreover, in the fifth aspect, the second generator may generate, for each of plural second business entities that satisfy the predetermined media-sharing condition, the second data. And, the providing unit may provide a fourth result measured for accesses to the second landing page corresponding to each of the plural second business entities from the same delivery destination. Furthermore, in the fifth aspect, the first generator and the second generator may work according to an action of the user of the delivery destination. In addition, in the fifth aspect, the delivery destination identification information for the same delivery destination may be generated differently for each print media or whenever generating personalized data.

In order to realize the advertising effectiveness measuring system, it is possible to create a program causing a computer to execute the aforementioned processing, and the program is stored on a computer-readable storage medium or storage device such as a flexible disk, a CD-ROM, a Magneto-optical disk, a semiconductor memory, and a hard disk. Intermediate processing results are temporarily stored in a storage device such as a main memory.

What is claimed is:

1. An information processing apparatus, comprising:
    a memory; and
    a processor coupled to the memory and configured to:
    in response to a request from a first business entity of a print media, first select, for each delivery destination of the print media among a plurality of delivery destinations, a second business entity among a plurality of business entities based on matching among conditions from the first business entity and the plurality of business entities and based on attributes of the delivery destination;
    first encode, for each combination of the first business entity and the each delivery destination of the print media, a first Uniform Resource Locator (URL) into a first QR code, wherein the first URL includes a first address to access a first Web page corresponding to the first business entity and a first delivery destination identifier to identify the delivery destination of the print media;
    second encode, for each combination of the second business entity and the each delivery destination of the print media, a second URL into a second QR code, wherein the second URL includes a second address to access a second Web page corresponding to the second business entity selected for the delivery destination and a second delivery destination identifier to identify the delivery destination of the print media;
    second select a printing company to be ordered to print first data with the first QR code and second data with the second QR code on a print media personalized for the each delivery destination from among a plurality of printing companies based on requirements from the first business entity, wherein the first data is data from the first business entity and is personalized for each delivery destination of the print media, and the second data is data from the second business entity and is personalized for each delivery destination of the print media;
    for each access to the first address, which is caused by scanning the first QR code printed on the print media by a user terminal of a first delivery destination among the plurality of delivery destinations, first measure the first delivery destination identifier of the first delivery destination, which is notified with the access through the first QR code, to record an access time in association with the measured first delivery destination identifier of the first delivery destination and an identifier of the first business entity, wherein the first address is an address of the first Web page, and the first measuring comprises receiving the first delivery destination identifier of the first delivery destination from a Web server of the first Web page including a measurement tag that has a function to measure the first delivery destination identifier notified with the access;
    for each access to the second address, which is caused by scanning the second QR code printed on the print media by a user terminal of a second delivery destination among the plurality of delivery destinations, second measure the second delivery destination identifier of the second delivery destination, which is notified with the access through the second QR code, to record an access time in association with the measured second delivery destination identifier of the second delivery destination and an identifier of the second business entity, wherein the second address is an address of the second Web page, and the second measuring comprises receiving the second delivery destination identifier of the second delivery destination from a Web server of the second Web page including a measurement tag that has a function to measure the second delivery destination identifier notified with the access; and
    extract, for each delivery destination identifier, an access time and an identifier of a business entity, with which the delivery destination identifier is associated, from data recorded in the first measuring and the second measuring to generate data representing recorded access times from respective delivery destinations to Web pages of respective business entities through QR codes.

2. The information processing apparatus according to claim 1, wherein the processor is further configured to identify, from the generated data, a delivery destination whose access time to the first Web page of the first business entity through the first QR code and access time to the second Web page of the second business entity through the second QR code are recorded.

3. The information processing apparatus according to claim 2, wherein the processor is further configured to extract, from delivery destinations identified in the identifying, a delivery destination whose access time to the first Web page of the first business entity through the first QR code is earlier than the access time to the second Web page of the second business entity through the second QR code.

4. The information processing apparatus according to claim 2, wherein the processor is further configured to extract, from delivery destinations identified in the identifying, a delivery destination whose access time to the second Web page of the second business entity through the second QR code is earlier than the access time to the first Web page of the first business entity through the first QR code.

5. The information processing apparatus according to claim 1, wherein the request from the first business entity of the print media is sent in response to an action of a user of the delivery destination.

6. The information processing apparatus according to claim 1, wherein the requirements from the first business entity include locations or areas of the delivery destinations, and the second selecting comprises narrowing down the plurality of printing companies based on the locations or areas.

7. The information processing apparatus according to claim 1, wherein the processor is further configured to:
monitor data collected from a factory of the selected printing company after an order to the selected printing company;
upon detecting an occurrence of an event that affects a delivery date and/or quality of the print media based on the data collected from the factory of the selected printing company, select a new printing company to be order to print based on the requirements from the first business company.

8. The information processing apparatus according to claim 1, wherein the delivery destination identifier for a same delivery destination is generated differently for each print media or each of the first data and the second data.

9. An information processing method, comprising:
in response to a request from a first business entity of a print media, first selecting, by a computer, for each delivery destination of the print media among a plurality of delivery destinations, a second business entity among a plurality of business entities based on matching among conditions from the first business entity and the plurality of business entities and based on attributes of the delivery destination;
first encoding, by the computer, for each combination of the first business entity and the each delivery destination of the print media, a first Uniform Resource Locator (URL) into a first QR code, wherein the first URL includes a first address to access a first Web page corresponding to the first business entity and a first delivery destination identifier to identify the delivery destination of the print media;
second encoding, by the computer, for each combination of the second business entity and the each delivery destination of the print media, a second URL into a second QR code, wherein the second URL includes a second address to access a second Web page corresponding to the second business entity selected for the delivery destination and a second delivery destination identifier to identify the delivery destination of the print media;
second selecting, by the computer, a printing company to be ordered to print first data with the first QR code and second data with the second QR code on a print media personalized for the each delivery destination from among a plurality of printing companies based on requirements from the first business entity, wherein the first data is data from the first business entity and is personalized for the each delivery destination of the print media, and the second data is data from the second business entity and is personalized for the each delivery destination of the print media;
for each access to the first address, which is caused by scanning the first QR code printed on the print media by a user terminal of a first delivery destination among the plurality of delivery destinations, first measuring, by the computer, the first delivery destination identifier of the first delivery destination, which is notified with the access through the first QR code, to record an access time in association with the measured first delivery destination identifier of the first delivery destination and an identifier of the first business entity, wherein the first address is an address of the first Web page, and the first measuring comprises receiving the first delivery destination identifier of the first delivery destination from a Web server of the first Web page including a measurement tag that has a function to measure the first delivery destination identifier notified with the access;
for each access to the second address, which is caused by scanning the second QR code printed on the print media by a user terminal of a second delivery destination among the plurality of delivery destinations, second measuring, by the computer, the second delivery destination identifier of the second delivery destination, which is notified with the access through the second QR code, to record an access time in association with the measured second delivery destination identifier of the second delivery destination and an identifier of the second business entity, wherein the second address is an address of the second Web page, and the second measuring comprises receiving the second delivery destination identifier of the second delivery destination from a Web server of the second Web page including a measurement tag that has a function to measure the second delivery destination identifier notified with the access; and
extracting, by the computer, for each delivery destination identifier, an access time and an identifier of a business entity, with which the delivery destination identifier is associated, from data recorded in the first measuring and the second measuring to generate data representing recorded access times from respective delivery destinations to Web pages of respective business entities through QR codes.

10. A non-transitory computer-readable storage medium storing a program for causing a computer to execute a process, comprising:
in response to a request from a first business entity of a print media, first selecting, for each delivery destination of the print media among a plurality of delivery destinations, a second business entity among a plurality of business entities based on matching among conditions from the first business entity and the plurality of business entities and based on attributes of the delivery destination;

first encoding, for each combination of the first business entity and the each delivery destination of the print media, a first Uniform Resource Locator (URL) into a first QR code, wherein the first URL includes a first address to access a first Web page corresponding to the first business entity and a first delivery destination identifier to identify the delivery destination of the print media;

second encoding, for each combination of the second business entity and the each delivery destination of the print media, a second URL into a second QR code, wherein the second URL includes a second address to access a second Web page corresponding to the second business entity selected for the delivery destination and a second delivery destination identifier to identify the delivery destination of the print media;

second selecting a printing company to be ordered to print first data with the first QR code and second data with the second QR code on a print media personalized for the each delivery destination from among a plurality of printing companies based on requirements from the first business entity, wherein the first data is data from the first business entity and is personalized for the each delivery destination of the print media, and the second data is data from the second business entity and is personalized for the each delivery destination of the print media;

for each access to the first address, which is caused by scanning the first QR code printed on the print media by a user terminal of a first delivery destination among the plurality of delivery destinations, first measuring the first delivery destination identifier of the first delivery destination, which is notified with the access through the first QR code, to record an access time in association with the measured first delivery destination identifier of the first delivery destination and an identifier of the first business entity, wherein the first address is an address of the first Web page, and the first measuring comprises receiving the first delivery destination identifier of the first delivery destination from a Web server of the first Web page including a measurement tag that has a function to measure the first delivery destination identifier notified with the access;

for each access to the second address, which is caused by scanning the second QR code printed on the print media by a user terminal of a second delivery destination among the plurality of delivery destinations, second measuring the second delivery destination identifier of the second delivery destination, which is notified with the access through the second QR code, to record an access time in association with the measured second delivery destination identifier of the second delivery destination and an identifier of the second business entity, wherein the second address is an address of the second Web page, and the second measuring comprises receiving the second delivery destination identifier of the second delivery destination from a Web server of the second Web page including a measurement tag that has a function to measure the second delivery destination identifier notified with the access; and extracting, for each delivery destination identifier, an access time and an identifier of a business entity, with which the delivery destination identifier is associated, from data recorded in the first measuring and the second measuring to generate data representing recorded access times from respective delivery destinations to Web pages of respective business entities through QR codes.

* * * * *